United States Patent
Dierickx

(10) Patent No.: US 8,426,828 B2
(45) Date of Patent: Apr. 23, 2013

(54) COMBINED INTEGRATION AND PULSE DETECTION

(75) Inventor: Bart Dierickx, Edegem (BE)

(73) Assignees: Caeleste CVBA, Antwerp (BE); Bart Dierickx, Edegem (BE)

(*) Notice: Subject to any disclaimer, the term of this patent is extended or adjusted under 35 U.S.C. 154(b) by 0 days.

(21) Appl. No.: 13/153,852

(22) Filed: Jun. 6, 2011

(65) Prior Publication Data
US 2012/0305786 A1 Dec. 6, 2012

(51) Int. Cl.
*G01T 1/26* (2006.01)
(52) U.S. Cl.
USPC .......................................................... 250/371
(58) Field of Classification Search ................. 250/371
See application file for complete search history.

(56) References Cited

U.S. PATENT DOCUMENTS
2010/0213353 A1  8/2010 Dierickx

OTHER PUBLICATIONS

Goldan et al., "A counting and integrating pixel readout chip for amorphous selenium direct radiation detectors for medical imaging applications," 2009, SPIE proceedings, vol. 7258 pp. 72583K-1 to 72583K-8.*
Kraft, Edgar et al., "Counting and Integrating Readout for Direct Conversion X-ray Imaging Concept, Realization and First Prototype Measurements", 2005 IEEE, vol. 5, 23-29, pp. 2761-2765, Oct. 2005.

* cited by examiner

Primary Examiner — Kiho Kim
(74) Attorney, Agent, or Firm — Bacon & Thomas, PLLC

(57) ABSTRACT

A pixel for the detection of electromagnetic radiation or high energy particles or charge packets, in particular for detecting X-ray photons, comprises a radiation receptor for converting the radiation into a sensing signal, the pixel being adapted for performing both pulse detection and integration of the same sensing signal.

19 Claims, 16 Drawing Sheets

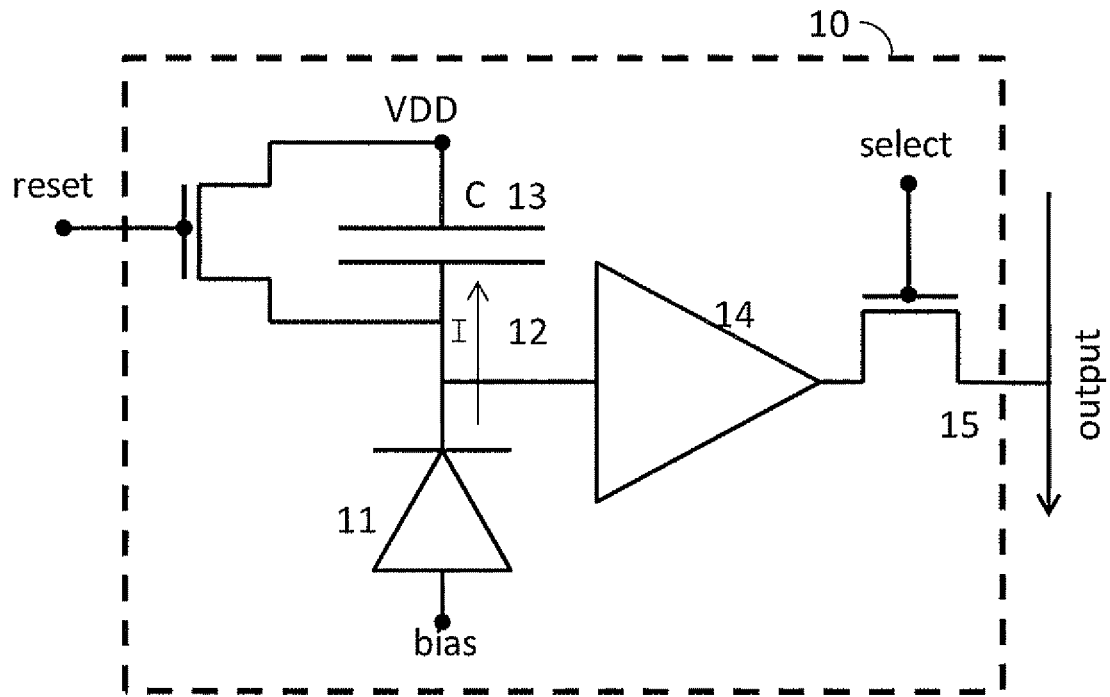
FIG. 1 – PRIOR ART
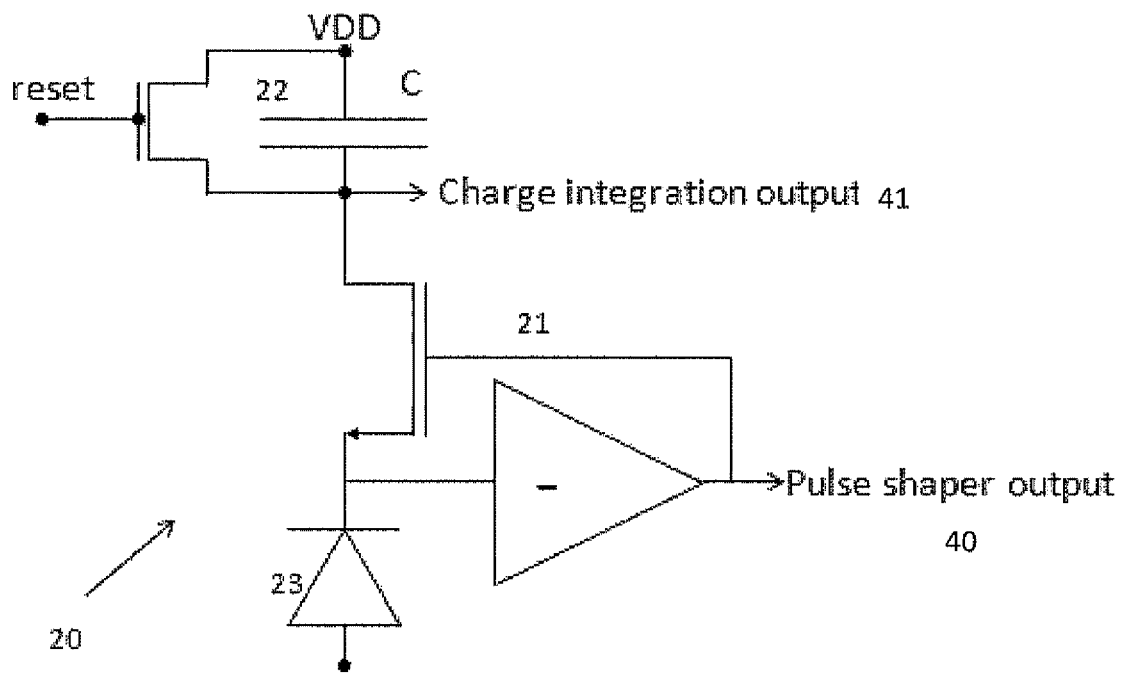
FIG. 2

COMBINED INTEGRATION AND PULSE DETECTION

FIELD OF THE INVENTION

In its most general form, the present invention relates to image sensing, such as medical imaging, automotive imaging, machine vision, night vision, digital photography or digital camcorder imaging. The present invention relates to detection of electromagnetic radiation (such as for example X-rays or visible light), high energy particles or packets of or individual charged particles. In particular, the present invention relates to devices and methods for detection of radiation or high energy particles, such as for example X-ray detection.

BACKGROUND OF THE INVENTION

X-radiation (composed of X-rays) is a form of electromagnetic radiation. X-rays have a wavelength in the range of 10 to 0.01 nm, corresponding to frequencies in the range $30 \times 10^{15}$ Hz to $30 \times 10^{18}$ Hz, and energies in the range 120 eV to 120 keV. X-rays are used for medical radiography, crystallography, non-destructive testing, security etc. X-rays are in practice generated by an X-ray tube, in some cases by synchrotron radiation.

State of the art X-ray image sensing is performed with pixels that are either based on charge or current integration (or "integrating") or photon counting (which are based on "pulse detection").

X-ray detection can be "direct", where an X-ray photon creates a packet of secondary electron-hole pairs in semiconductor material. The secondary electron-hole pairs are subsequently read by a charge sensitive amplifier. Alternatively, X-ray detection can be "indirect", where an X-ray photon is absorbed in a scintillator material where it creates a flash of secondary, visible light, which secondary light is subsequently detected by a visible light image sensor.

In case of e.g. charge integration combined with indirect detection, the image sensor is used for detection of the secondary visible radiation. The image sensor converts this visible radiation into analog electrical signals (current, charge or voltage). The more radiation impinges on the image sensor integrated over time, the higher the corresponding electrical signal. Integrating pixels are simple and well-known electronic circuits. These have three or a few more transistors. Many examples exist in the state of the art, of which a very simple one is represented in FIG. 1. The pixel 10 illustrated comprises a radiation transducer such as a photodiode 11, for converting radiation impinging on the pixel 10 into an electrical signal such as for example a photocurrent 12. The thus generated photocurrent 12 integrates on an integrating element such as a capacitor 13. A voltage buffer 14 may be provided between the integrating element 13 and a multiplexing network 15 or read-out circuitry for reading out a radiation value.

X-radiation consists of separate X-ray photons, which can be detected as separate electrical pulses. A pulse detecting pixel, which is often, but not always, also a photon counting pixel, may be superior to an integrating pixel for signal to noise reasons. However, such counting pixels are complex devices. They have an analog front-end that detects pulses (the front end for example comprising a pulse shaper, a comparator) and an elaborate digital counter. The number of transistors is in the hundreds (100 . . . 1000).

It is generally understood that the pulse detecting or counting approach is superior over the integrating approach in terms of noise, especially at low radiation levels. The counting of photons is essentially noise free (apart from the inherent photon shot noise, PSN), whereas with integration, the collected noise charge is contaminated by analog "read noise".

A further advantage of photon counting is that one can do at the same time energy (or wavelength) discrimination, and thus obtain at the same time images for different bands of photon energies (which is referred to as "color X-ray", similar to the wavelength discrimination in visible light image sensors).

In the applicant's patent application US2010/213353, the burden of the huge transistor count of digital counting is somewhat relaxed by employing analog domain counting.

In "Counting and Integrating Readout for Direct Conversion X-ray Imaging—Concept, Realization and First Prototype Measurements", Nuclear Science Symposium Conference Record, 2005 IEEE Volume 5, 23-29 Oct. 2005, pages 2761-2765, E. Kraft et al. report a signal processing concept for X-ray imaging with directly converting pixilated semiconductor sensors. At the basis of this approach lies the combination of charge integration and photon counting in every single pixel. Simultaneous operation of both signal processing chains extends the dynamic range of the pixel beyond the limits of the individual schemes, and allows determination of the mean photon energy. Medical applications such as X-ray computed tomography can benefit from this additional spectral information through improved contrast. The pixel disclosed contains three basic elements: a photon counter, an integrator and a special feedback circuit which provides both signal shaping for the photon counter and signal replication for the integrator.

SUMMARY OF THE INVENTION

It is an object of embodiments of the present invention to combine the advantages of a pulse detecting or counting pixel with an integrating pixel, and this in a simple way.

The above objective is accomplished by a method and device according to embodiments of the present invention.

In a first aspect, the present invention provides a pixel (or unit cell) for the detection of electromagnetic radiation, charge carriers or high energy particles. The pixel comprises at least one radiation receptor, which may be a direct detector or an indirect detector or an input for electrical charge, for converting the electromagnetic radiation, charge carriers or impinging high energy particles into a signal here called "sensing signal" (which may be a radiation signal but does not limit the invention to the detection of radiation; it can also be e.g. the signal of a (bio)chemical sensor, or an acoustic sensor, or an antenna etc.). The sensing signal may be an electrical signal, such as voltage, current, or charge, represented in DC or AC, as an AM, FM or phase modulation signal, pulse width modulated (PWM), as pulse trains or similar known to the person skilled in the art of signal modulation. Particular examples of radiation receptors are photodiodes or photoresistors.

The pixel is adapted for performing both pulse detection and integration on at least a same portion of the same sensing signal. In particular embodiments, the pixel is adapted for performing both pulse detection and integration on the same sensing signal.

A pixel according to embodiments of the present invention may comprise at least one pulse detecting circuit for converting the portion of the sensing signal, e.g. the sensing signal, into an electrical pulse train, and optionally one or more analog or digital accumulators to count the number of pulses or to discriminate their energy, etc.

The term "accumulator" is used in this context as a generic term for operators or circuits that handle the pulse detection output. These can be counter, or timing circuits, circuits for magnitude thresholding or discrimination, logic or analog operators, decision logic acting upon other circuitry in the pixel etc. An accumulator may be adapted for accumulating a logical or analog operation of several pulse detecting circuits (inside or outside the same pixel). To this end, it may be provided with logic (with flipflops), combinatoric (without flipflops) or analog (e.g. for performing width detection or pulse width modulation) components or systems. Such logic or combinatoric operations can for example be AND, NAND, NOT, XOR, majority, maximum, minimum, difference, median, winner-takes-all etc. Also some analog operators as filters may act upon pulse detector output.

The pixel also comprises at least one integration circuit for simultaneously integrating the same portion of the same sensing signal. In this way, a pixel is provided that has the possibilities and advantages of both integrating and pulse detecting pixels.

The at least one pulse detection circuit and the at least one integration circuit are coupled such that, in operation, the same portion of the sensing signal passes in series through the at least one pulse detection circuit and through the at least one integration circuit.

It is to be noted that, although one can in theory integrate the pulse output of a pulse detecting circuit, this is fundamentally different from the integration of the sensing signal itself. The sensing signal will have variable charge package sizes for photons of different energies, whereas the pulse detecting output is more or less identical irrespective of the photon energy (a similar difference applies for the detection of particles). In fact, by comparing both (an integration output and a pulse detection output) one will have the possibility to calculate the average charge per photon, and may thus obtain spectral information.

Simultaneously performing integration and pulse detection on the same sensing signal is different from the cited prior art, in that the prior art does photon counting on the sensing signal, and uses a replication of the sensing signal for performing integration. Directly using the sensing signal for both pulse detection and integration is advantageous because it is more compact and straightforward as circuit, it is less prone to signal degradation as the replica is subject to noise, non-linearity, gain and offset errors, etc. . . . .

The pulse detecting circuit, e.g. pulse detector, for converting the sensing signal into at least one electrical pulse, and most probably a plurality of pulses, may comprise a pulse shaper or band filter or matched filter or charge amplifier or alike to convert the radiation pulse to an electrical pulse, and a comparator for discriminating pulses in the sensing signal that have a magnitude, such as an amplitude or area or length or width, which is above or below a reference value, or in a range between two reference values. A pulse detection circuit can even be realized by an operator on two or more integrating circuit outputs, such as a difference or a maximum operation.

A pixel according to embodiments of the present invention may comprise a plurality of comparators having different reference values. In this embodiment, the sensing signal is, in each of the comparators, and depending on the reference signals, transformed to a different binary pulse train. In embodiments of the present invention, each of the comparators may be functionally coupled to an analog or digital accumulator in a one-to-one relationship. In these embodiments, a different output signal may be obtained at the output of each accumulator. In alternative embodiments, each of the comparators may be functionally coupled to an accumulator, a plurality of comparators being coupled to the same accumulator. In these embodiments, the accumulator handles the pulses from each of the comparators coupled to it.

In embodiments of the present invention, the output of a pulse detector, e.g. a counter, and/or of an integrator may be connected to an analog or digital memory, for storing its output signal. The memory may be part of a sample and hold stage. This way, the output signal of the pulse detector, e.g. counter, and or integrator may be available for later readout or processing.

In embodiments of the present invention, the sensing signal (coming from the radiation receptor) is also applied to at least one integration circuit, for example comprising a pulse shaper and an integrator. If the sensing signal is a current or a charge (as in most cases), this may happen in series, such that the same currents flow in series through circuit parts, according to the first law of Kirchhoff. If the sensing signal is a voltage, it may stand over circuit parts in series according to the second law of Kirchhoff. If the sensing signal is a change of resistance (like as with a photo resistor or a bolometer), one may consider to read it as a current by applying a voltage, or as a voltage by applying a current. If the signal is a charge packet, it may be considered as a short current or as a voltage when the charge stands over a capacitor. If the sensing signal is a change of capacitance, this change can be measured by applying a voltage step or a modulated voltage and measuring the current, or applying a current step or modulated current and measuring the voltage. Many more representations of the term "sensing signal" can be envisaged. In many cases in this disclosure the signal is thought of as a current or train of charge packets, but this is not limiting.

The present invention also provides a pixel for image sensing comprising at least two radiation receptors for converting radiation, charge carriers or high energy particles impinging onto the pixel into a first and a second sensing signal and at least two integration circuits for integrating the first and the second sensing signals. In such pixels, a pulse detection circuit may be realized by a non-linear operator on the outputs of the two or more integrating circuits. The non-linear operator may in particular be provided inside the pixel.

In a second aspect, the present invention provides a method for detecting electromagnetic radiation, charge carriers or impinging high energy particles. The method comprises converting the electromagnetic radiation, charge carriers or impinging high energy particles into a sensing signal, and performing pulse detection and integration of a same portion of the same sensing signal. Performing pulse detection and integration of a same portion of the same sensing signal may comprise converting the sensing signal (optionally a portion of the sensing signal) into at least one electrical pulse, optionally a pulse train, and simultaneously integrating the same sensing signal, optionally the same portion of the sensing signal.

In embodiments of the present invention, converting the electromagnetic radiation, charge carriers or impinging high energy particles may comprise discriminating pulses having a magnitude, such as an amplitude or area or length or width, above or below a reference value, or between two reference values. Such discriminating may comprise comparing the sensing signal to at least one reference value.

In embodiments of the present invention, discriminating pulses in the sensing signal may comprise comparing the sensing signal to a plurality of reference values, thus generating a plurality of pulse trains. A method according to embodiments of the present invention may further comprise performing a logic, combinatoric or analog operation on the plurality of pulse trains from one or more pixels, so as to result in a combined pulse train. Alternatively, a logic, combinatoric or analog operation may be performed on a plurality of sensing signals or pulse shaped sensing signals, i.e. before the sensing signals are converted into pulse trains. The sensing signals may be emanating from a single pixel or from a plurality of pixels. Such logic operation can for example be AND, NAND, NOT, XOR, or majority. Such analog operation may be maximum, minimum, difference, median, winner-takes-all etc.

In embodiments of the present invention, the multiple pulse trains may be differently accumulated, e.g. they may act in different ways onto counters or accumulators. As an example only, one pulse train may result in an increase of accumulation signal or count while another pulse train may result in a decrease of accumulation signal or count. This way, a difference or ratio between pulse trains may be obtained.

A method according to further embodiments of the present invention may furthermore comprise storing a result of integrating the sensing signal, and/or accumulating the pulses of a pulse train in a memory, for example an analog memory, for later readout or processing. The memory may be part of a sample and hold stage.

In a third aspect, the present invention provides an array of pixel according to embodiments of present invention. The pixels may comprise modulation circuitry for modulating the sensing signal, where the modulation circuitry of a particular pixel is adapted for being controlled by an output signal of a pulse detection circuit of that particular pixel and/or by an output signal of a pulse detection circuit of another pixel in the array. Preferably, the another pixel in the array is a neighbouring pixel.

In a further aspect, the present invention provides a pulse shaper circuit with logarithmic feedback, comprising an inverting feedback amplifier and a non-linear resistor in the feedback loop of the feedback amplifier. A pulse shaper circuit according to embodiments of the present invention may furthermore comprise a non-linear capacitor in the feedback loop of the feedback amplifier. The non-linear resistor may be implemented as a MOSFET in weak inversion. The MOSFET may have its drain and gate or source and gate connected together. In a pulse shaper circuit according to embodiments of the present invention, the MOSFET may have its source or drain connected, directly or indirectly, to a node that is not part of the pulse shaper circuit, e.g. a DC voltage or the input of an integrator circuit. If the MOSFET has its drain or source connected to an integrator circuit, a pixel in accordance with embodiments of the present invention may be formed.

The pulse shaper circuits according to embodiments of the present invention may be used in pixels according to embodiments of the present invention.

In a further aspect, the present invention provides an image sensing device comprising at least one pixel, the pixels comprising at least two radiation receptors for converting radiation, charge carriers or high energy particles impinging onto the pixel into a sensing signal, the pixels being adapted for performing integration of each of the sensing signals, and at least one non-linear operator for applying a non-linear operator on the integrated sensing signals of a pixel. The at least one non-linear operator may be an operator provided in each of the pixels, or an operator common to a plurality of pixels.

An image sensing device according to embodiments of the present invention may furthermore comprise a multiplexer between the plurality of pixels and the non-linear operator.

In an image sensing device according to embodiments of the present invention, the non-linear operator may be a circuit adapted for taking a minimum response, or the average of the lower responses, or the average of the responses after excluding the maximum response of the integrated sensing signals of a pixel.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Particular and preferred aspects of the invention are set out in the accompanying independent and dependent claims. Features from the dependent claims may be combined with features of the independent claims and with features of other dependent claims as appropriate and not merely as explicitly set out in the claims.

Aspects of the invention will be apparent from and elucidated with reference to the embodiments) described hereinafter.

BRIEF DESCRIPTION OF THE DRAWINGS

FIG. 1 schematically illustrates an integrating pixel according to one of the many possibilities known in the state of the art.

FIG. 2 schematically illustrates a pixel according to a first embodiment of the present invention, comprising a pulse detection circuit and an integration circuit acting simultaneously and in series onto a sensing signal emanating from a radiation receptor converting impinging radiation, charge carriers or energy particles.

FIG. 4 conceptually illustrates a pixel according to the first embodiment of the present invention, of which FIG. 2 illustrates a particular example.

Figure 3:
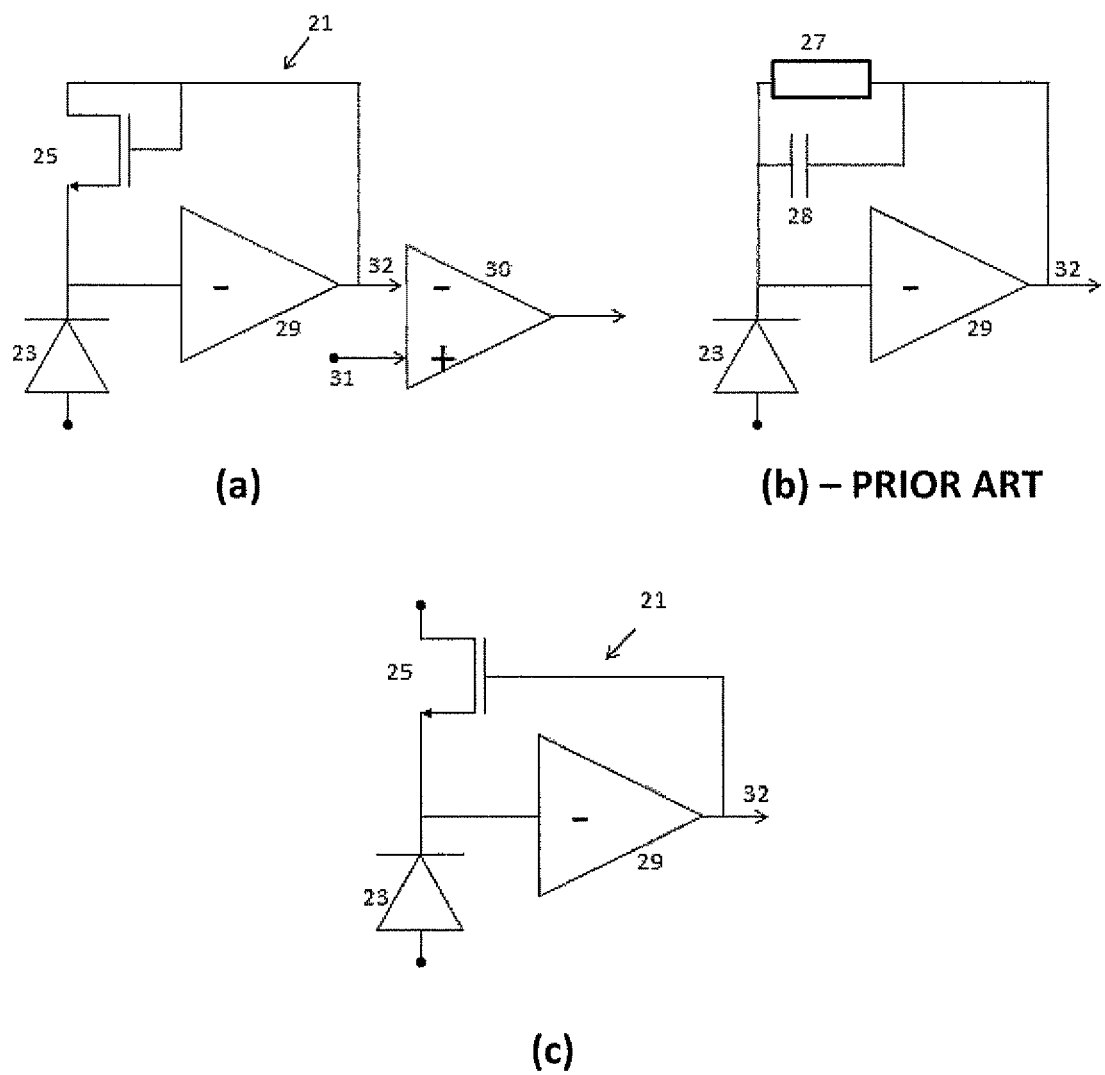
FIG. 3(a) schematically illustrates a pulse detection circuit according to embodiments of the present invention, and compares this to a prior art pulse detection circuit as illustrated in FIG. 3(b).
FIG. 3(c) illustrates a pulse detection circuit according to embodiments of the present invention for use with a pixel according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The input signal to an image sensor pixel in accordance with embodiments of the present invention is the radiation intensity at the location of that pixel. The radiation may be any of optical (or visible) light, IR light, UV light, high energy particles, X-rays, and even charges from a non-radiation sensor such as e.g. a (bio)chemical sensor, an acoustic sensor, an antenna etc. In the context of the present invention, with "radiation" is meant any of electromagnetic radiation, charge carriers, high energy particles or charges from a non-radiation sensor. In the following, embodiments of the present invention will be described with reference to pixels for detection of X-rays as a particular type of radiation; the present invention, however, not being limited thereto.

An image sensor pixel according to embodiments of the present invention, for detection of radiation intensity, comprises at least one radiation receptor for converting radiation impinging onto the pixel into a sensing signal. The sensing signal may for example be an electrical signal such as a current or a voltage, or a charge. The image sensor pixel according to embodiments of the present invention is adapted for simultaneously performing both pulse detection and integration on the same sensing signal, or on the same portion of the same sensing signal. Hereto, at least one pulse detection circuit may be provided for converting the sensing signal into at least one electrical pulse, and at least one integration circuit for integrating the sensing signal. The pixel is configured such that the sensing signal or a portion of the sensing signal passes in series through at least one of the pulse detection circuits and through at least one of the integration circuits. With "same sensing signal" is meant that no signal duplication circuitry is provided between the at least one pulse detection circuit and the at least one integration circuit. The image sensor pixel according to embodiments of the present invention is such that the sensing signal or portion thereof which passes through the at least one pulse detection circuit is applied to the integration circuit, or such that the sensing signal or portion thereof which passes through the at least one integration circuit is also applied to the pulse detection circuit.

Hence, in accordance with embodiments of the present invention, an image sensor pixel is provided with both means for integrating a sensed radiation, and means for pulse detection or pulse counting the sensed radiation. Hence the advantages of a pulse detecting pixel (e.g. essentially noise free, can detect low radiation levels) may be combined with the advantages of an integrating pixel (can detect higher radiation levels).

A general pixel 20 according to a first embodiment of the present invention is illustrated in FIG. 2. A pixel 20 is illustrated, with one pulse detector, for example implemented as a pulse shaper circuit 21, and one integrator 22, both acting upon and in series with a same signal current emanating from a radiation transducer or charge input, represented here as a (photo)diode 23. Not illustrated in FIG. 2 are further pixel circuit elements as buffers, multiplexers, accumulators, etc. The pixel 20 has two output ports, for each delivering an output signal: a pulse shaper output signal 40 and a charge integration output signal 41.

The Pulse Detection Circuit

With the pixel comprising "at least one pulse detection circuit" is meant that the pixel has a provision to create a transient electrical pulse to indicate the passage or detection of a particle, photon, charge packet etc.

Such pulse detection circuit may typically be performed in a so-called pulse shaper circuit 21, which shapes packets of charges, photons etc. into a pulse. The pulse shaper circuit must not necessarily be followed by a comparator and a real counter, but in most cases a comparator and a counter are placed after the pulse detection circuit. The comparator 30 then compares the generated pulses to a reference value $V_{ref}$ 31. Alternative possibilities, also embodiments of the present invention, may include a time stamp circuit, a kernel operation with neighboring pixels, etc which follow the pulse shaper circuit.

Counters themselves may be analog, as for example in 162010/213353, or digital.

As illustrated in the pulse detection circuit of FIG. 3(a), the intensity of e.g. the impinging X-rays is transduced by a radiation receptor and its associated circuits to an analog voltage at the output of the pixel. The sensing may be done via a sensor circuit, comprising a phototransducer such as, for example, a reverse-biased photodiode 23. The sensor circuit, e.g. photodiode 23, collects radiation generated charge carriers, e.g. electrons, the charge carriers being generated e.g. under influence of the impinging X-rays. The charge carriers generate an electrical signal, such as e.g. a charge packet, a current or a voltage. Such packets with hundreds of electrons are shaped to electrical pulses 32 by a pulse shaper circuit 21. The pulse shaper circuit 21 illustrated comprises an inverting feedback amplifier 29 and a non-linear resistor and capacitor, which are realized as a MOSFET 25 in weak inversion.

It is to be noted that the pulse shaper circuit 21 illustrated in FIG. 3(a) is similar but not identical to a classic pulse shaper circuit as shown in FIG. 3(b), comprising an inverting feedback amplifier 29 and a separate (linear) resistor 27 and capacitor 28. In a prior art pulse shaper circuit as in FIG. 3(b), the linear resistor needs to have a value in the order of gigaohms, which is very difficult or even impossible to implement in current CMOS technologies. It is an advantage of a pulse shaper circuit 21 in accordance with embodiments of the present invention that is can easily be manufactured and integrated in CMOS circuitry.

A comparator 30 compares the generated pulses 32 to a reference signal $V_{ref}$ 31. The comparator 30 may have an adjustable threshold: this allows separating the noise from the useful signal, and recognizing the energy of the photon. In the comparator 30, the analog signal is converted into a binary signal. Every time a relevant parameter, such as e.g. the amplitude, area, width or length, of the pulses 32 exceeds a corresponding parameter in the reference signal $V_{ref}$ 31, a first value, for example high or digital one, is assigned to the output signal of the comparator 30, and every time the pulses 32 are below the reference value $V_{ref}$ a second value, for example low or digital zero, is assigned to the output signal of the comparator 30. This way, a binary signal is made, comprising a pulse train. The pulses in the pulse train may then be counted by means of a digital or analog counter (not illustrated in FIG. 3(a)), in order to provide a count value for the impinging incident packets of charges, photons, etc.

A pulse shaper circuit according to embodiments of the present invention, for use in a pixel in accordance with embodiments of the present invention is illustrated in FIG. 3(c).

The Integration Circuit

Integrating circuits can be of various nature too. Some embodiments are the classic 3T and 4T pixels and many others which are charge integrators. Other embodiments are the charge feedback amplifiers (CTIA) and may others known to people skilled in the art.

Integrators may also be digital in nature of output signal. Some embodiments are an analog integrator followed by an ADC, or a "smart reset" pixel, where the incoming current is integrated to a certain level, where the crossing of the level provokes a digital pulse and a reset of the integrator, that maybe used itself a digital or analog counting.

Any suitable type of integration circuit may be used in a pixel in accordance with embodiments of the present invention.

Combinations of Integrators and Pulse Detectors

Many combinations of pulse detectors and integrators in a pixel according to embodiments of the present invention are possible, as illustrated as examples, but not exhaustively, in FIG. 4 to FIG. 9.

Figure 4:
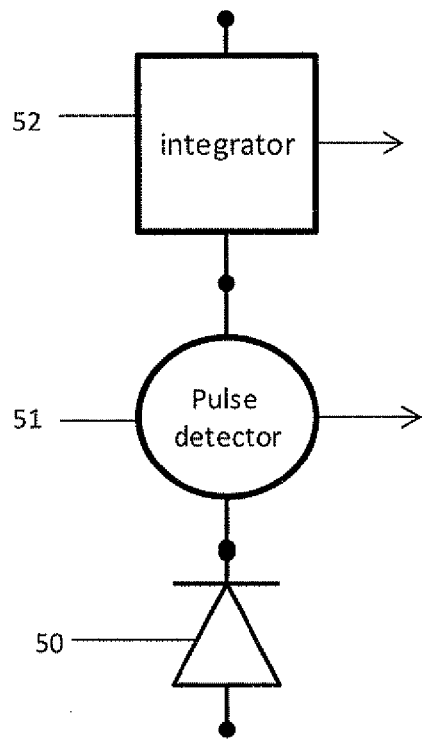

A pixel according to a first embodiment of the present invention is diagrammatically illustrated in FIG. 4. The signal from a radiation detector 50 passes through a pulse detector 51 and an integrator 52 which are coupled in series. The pulse detector 51 and the integrator 52 are directly connected to one another, i.e. no switch or other circuitry is provided in between. An exemplary implementation of this embodiment is illustrated in FIG. 2. Pulse detection and integration is performed substantially simultaneously on the same sensing signal emanating from the radiation detector 50.

Figure 5:
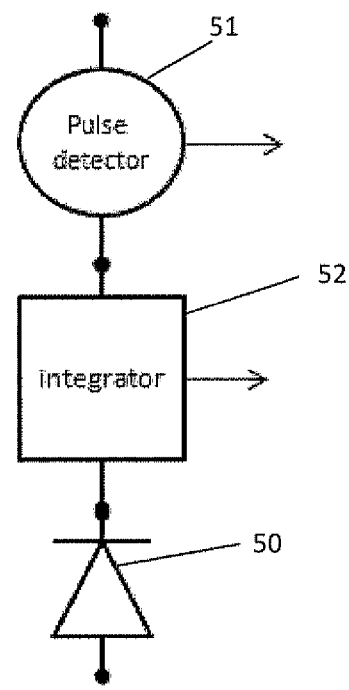
FIG. 5 conceptually illustrates a pixel according to a second embodiment of the present invention, wherein the sensing signal from a photoreceptor first goes through an integrator and then through a pulse detector, the integrator and the pulse detector being coupled in series.

A pixel according to a second embodiment of the present invention is diagrammatically illustrated in FIG. 5. The signal from a radiation detector 50 passes first through an integrator 52 and then through a pulse detector 51 coupled in series. The pulse detector 51 and the integrator 52 are directly connected to one another, i.e. no switch or other circuitry is provided in between. Again, pulse detection and integration is performed substantially simultaneously, and on the same sensing signal emanating from the radiation detector 50.

Figure 6:
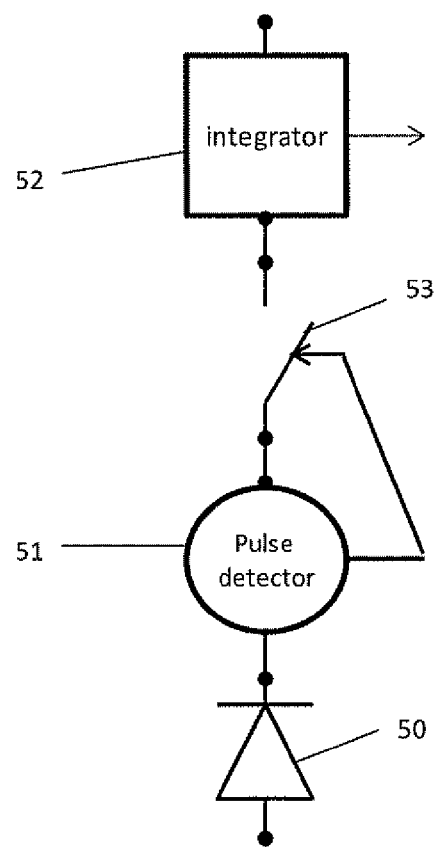
FIG. 6 conceptually illustrates a pixel according to a third embodiment of the present invention, comprising a pulse detector and an integrator, the output signal from the pulse detector being used for modulating the sensing signal being fed to the integrator.

A pixel according to a third embodiment of the present invention is diagrammatically illustrated in FIG. 6. The signal from the radiation detector 50 or particle detector goes through a pulse detector 51 to an integrator 52, but the amount of the signal that goes to this integrator 52 is modulated (turned on or off) by a circuit (switch 53) that is driven by the pulse detector output. Hence, in the embodiment illustrated, a switch 53 is provided between the pulse detector 51 and the integrator 52. The output signal of the pulse detector 51 will be used to determine whether or not the integrator 52 will integrate the sensing signal. When the switch 53 is closed, pulse detection and integration is performed on the same sensing signal emanating from the radiation detector 50.

Figure 7:
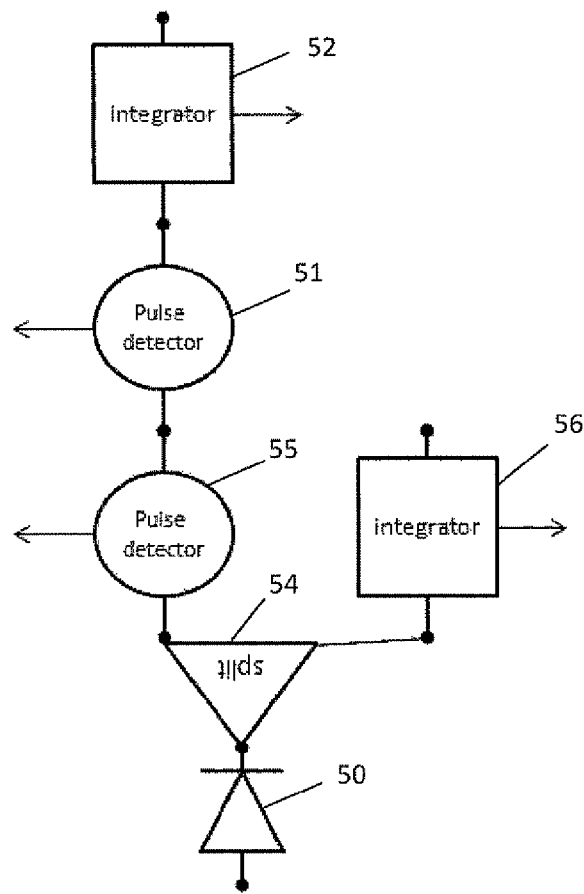
FIG. 7 conceptually illustrates a pixel according to a fourth embodiment of the present invention, comprising a splitter for splitting the sensing signal emanating from a photoreceptor in two portions, the first portion being fed to a series connection of two pulse detectors and an integrator, and the second portion being fed to an integrator.

A pixel according to a fourth embodiment of the present invention is diagrammatically illustrated in FIG. 7. The signal from the radiation detector 50 is split in a splitter 54 into at least two parts, in the embodiment illustrated two parts. The two parts do not necessarily need to be equal. The first part goes through two pulse detectors 55, 51 in series and ends up in a first integrator 52 also coupled in series with the pulse detector 51. This, however, is only one embodiment and is not intended to be limiting. Pulse detection and integration of the first part of the sensing signal are performed substantially simultaneously, and on the same portion of the sensing signal emanating from the radiation detector 50. The second part of the sensing signal is directly integrated by a second integrator 56. Such configuration is particularly useful when the signal is split in a large and a small fraction, which would, when integrated, saturate at different moments. The integration of the small fraction, lasting longer, can then extend the dynamic range.

Figure 25:
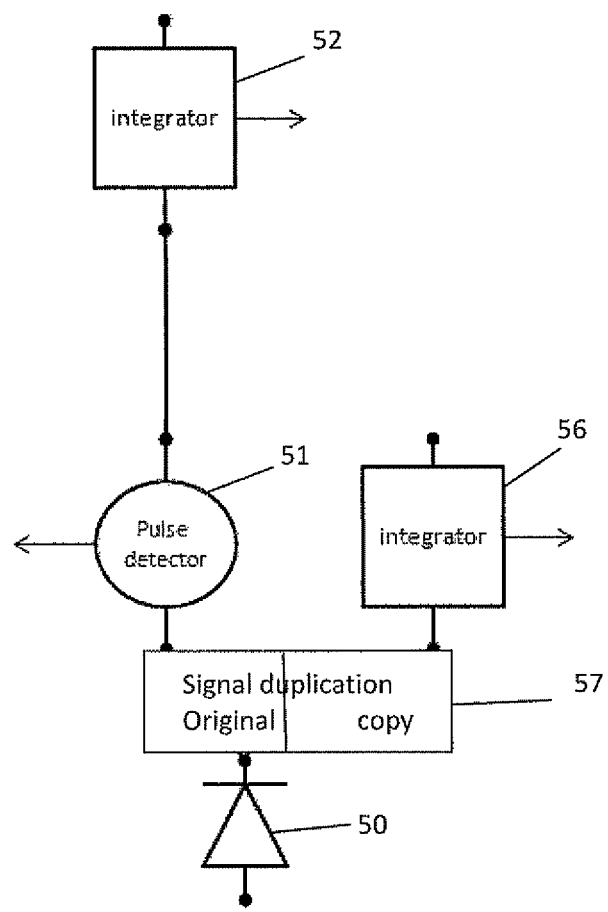
FIG. 25 conceptually illustrates a pixel according to a further embodiment of the present invention, comprising signal duplication circuitry for duplicating the sensing signal emanating from a photoreceptor, the original sensing signal being fed to a series connection of a pulse detector and an integrator, and the copy being fed to an integrator.

A pixel according to a further embodiment of the present invention is diagrammatically illustrated in FIG. 25. The signal from the radiation detector 50 is duplicated in duplication circuitry 57. Either one of the original signal or the duplicated signal, in the example illustrated the original signal, is applied to a pulse detector 51 and an integrator 52 coupled in series. The copy of the sensing signal is applied to other circuitry, such as for example a further integrator 56. Pulse detection and integration are performed substantially simultaneously and on the same portion of the same sensing signal.

Figure 8:
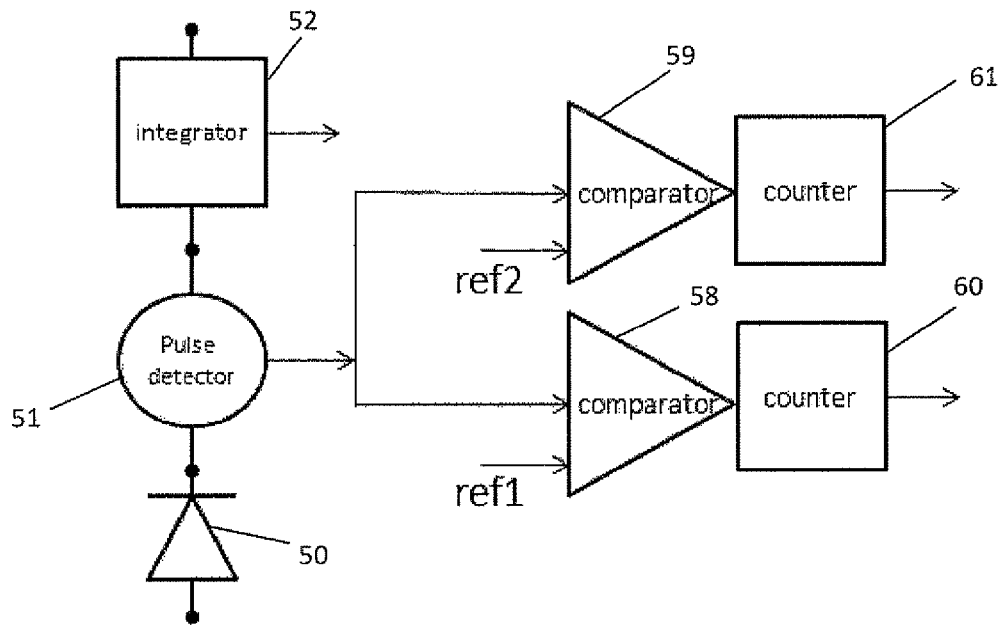
FIG. 8 conceptually illustrates a pixel according to a fifth embodiment of the present invention, comprising a series connection of a pulse detector and an integrator, wherein the signal of the pulse detector is fed to two comparators with different reference values and their corresponding counters.

A pixel according to a fifth embodiment of the present invention is diagrammatically illustrated in FIG. 8. The signal from the radiation detector 50 passes through a pulse detector 51 and in series ends up in an integrator 52. Pulse detection and integration are performed substantially simultaneously, and on the same sensing signal emanating from the radiation detector 50. The pulse detector output is fed to two comparator circuits 58, 59 that each have an own reference, ref1 and ref2, respectively. Each comparator circuit output is counted in an own counter 60, 61. Such pixel may be applied in situations where energy level discrimination and/or spectral sensitivity are desired, hence for example in color X-ray.

Figure 9:
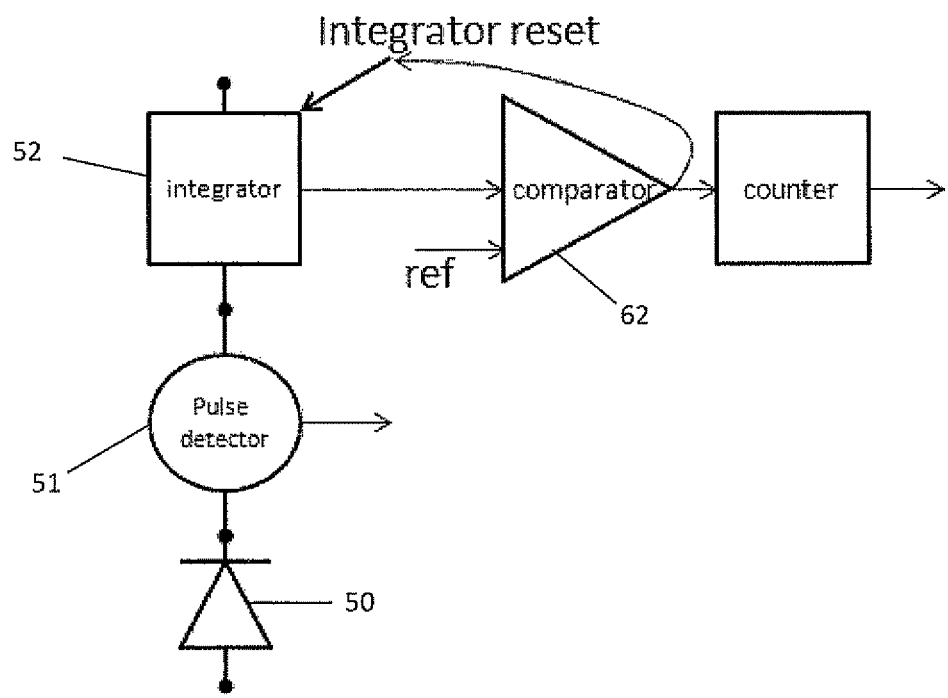
FIG. 9 conceptually illustrates a pixel according to a sixth embodiment of the present invention, comprising a series connection of a pulse detector and an integrator, wherein the integrated signal is applied to a comparator where it is compared to a reference value, and the output of the comparator is fed back to the integrator for resetting the integrator.

A pixel according to a sixth embodiment of the present invention is diagrammatically illustrated in FIG. 9. The signal from the radiation detector 50 passes through a pulse detector 51 and in series ends up in an integrator 52. Pulse detection and integration are performed substantially simultaneously, and on the same sensing signal emanating from the radiation detector 50. The output of the integrator 52 is compared to a reference ref in a comparator 62. If the reference is crossed, the integrator 52 is reset, and a counter 63 is incremented.

In a pixel according to embodiments of the present invention, at least one integrator 52 and at least one pulse detector 51 are coupled in series. The pixel, however, may comprise more than one integrator. The integrator(s) on top of the one coupled in series with the pulse detector may also be coupled in series with the pulse detector (embodiment not illustrated in the drawings) or they may be coupled onto another part of the sensing signal, as e.g. in, but not limited to, the embodiment of FIG. 7, or onto a duplicated portion of the sensing signal, as e.g. in, but not limited to, the embodiment of FIG. 25.

The pixel may also comprise more than one pulse detector. The pulse detector(s) on top of the one coupled in series with the integrator 52 may also be coupled in series with the integrator 52, as e.g. in, but not limited to, the embodiment of FIG. 7, or they may be coupled onto another part of the sensing signal (embodiment not illustrated in the drawings), or onto a duplicated portion of the sensing signal (embodiment not illustrated in the drawings).

In embodiments of the present invention, the output signal of the pulse detector 51 can be used to modulate, activate (activate=turn on or off), suppress or redirect the sensing signal in an integrator 52 inside the same or nearby pixels.

In accordance with embodiments of the present invention, the pulses of the binary signal (pulse train) produced by the comparator 30 following the pulse shaper 21 may be processed further e.g. in an accumulator or a counter, and may be read out, or, not be read out but used in the pixel itself or in neighboring pixels for other purposes.

In accordance with particular embodiments of the present invention, a pixel may comprise a series connection of an integrator in the form of a pinned photodiode 100, and a pulse detector in the form of an avalanche diode 101. Such implementation is illustrated as an example in FIG. 22, FIG. 23 and FIG. 24. In accordance with embodiments of the present invention, the pinned photodiode 100 is coupled in series with the avalanche diode 101, such that the photocurrent of the pinned photodiode 100 is fed to the avalanche diode 101.

In the embodiments illustrated, the sensing signal (e.g. photon current) is integrated in the pinned photodiode 100. In the embodiments illustrated, the pinned photodiode is formed by a buried diode layer 102 of a first dopant type in a substrate of a second dopant type, for example an N-type buried diode layer in a P-type substrate, covered by a pinning layer 103 of the second dopant type, for example a P-type pinning layer. A transfer gate 104 may be provided in between the pinned photodiode 100 and the avalanche diode 101. When turning the transfer gate 104 high (it is to be noted that one can opt to leave the transfer gate 104 permanently high), the integrated signal is transferred to the avalanche diode section. If the integrated signal is zero, nothing will happen. When the integrated current is not zero, this charge goes in the avalanche diode 101, and either (1) creates an avalanche breakdown when the diode is biased in "Geiger mode", which is a pulse detecting event and can subsequently be used to count, or (2) is multiplicated by the avalanche multiplication effect when the diode is biased in multiplication mode.

Hence, in accordance with embodiments of the present invention, the avalanche diode may be in Geiger mode or in multiplication mode. In Geiger mode, a complete breakdown is obtained for 1 electron or photon, thus the diode is suitable for photon counting. In multiplication mode, the electrons multiply but the diode does not break down. In such implementation, the avalanche diode is useful for signal amplification. In this case, the avalanche diode 101 is the photon detector, the pinned diode 100 with transfer gate is the integrator.

The photocurrent may be modulated by the transfer gate 104 associated to the pinned photodiode 100.

Figure 22:
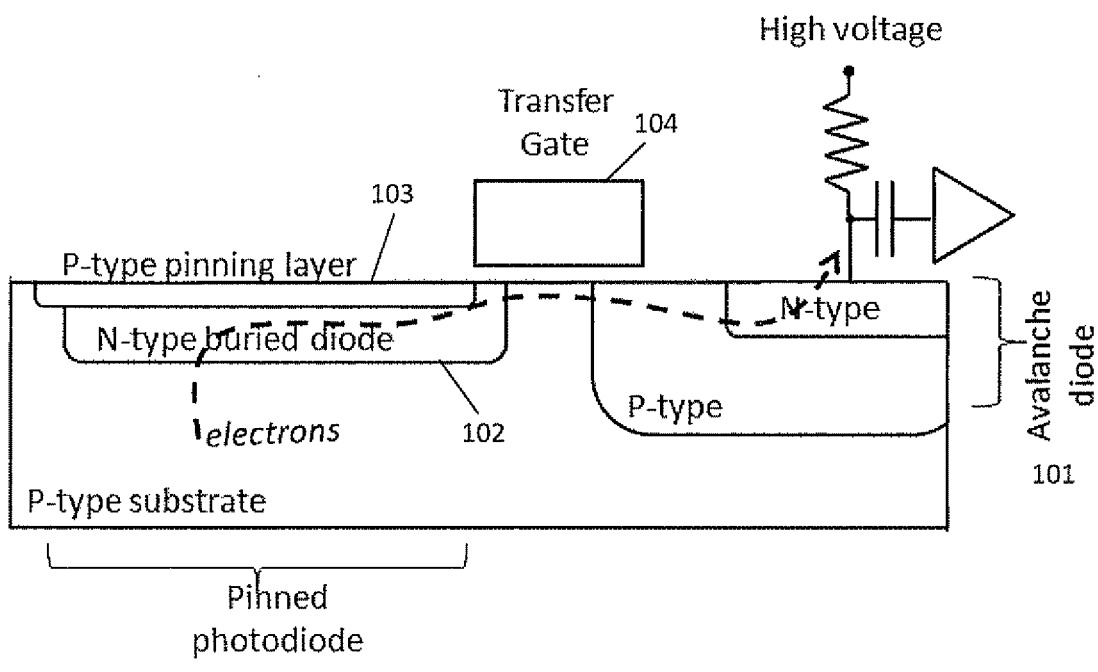
FIG. 22, FIG. 23 and FIG. 24 illustrate cross-sections of implementations of pixels that comprise a series connection of an integrator in the form of a pinned photodiode, and a pulse detector in the form of an avalanche diode.
Figure 23:
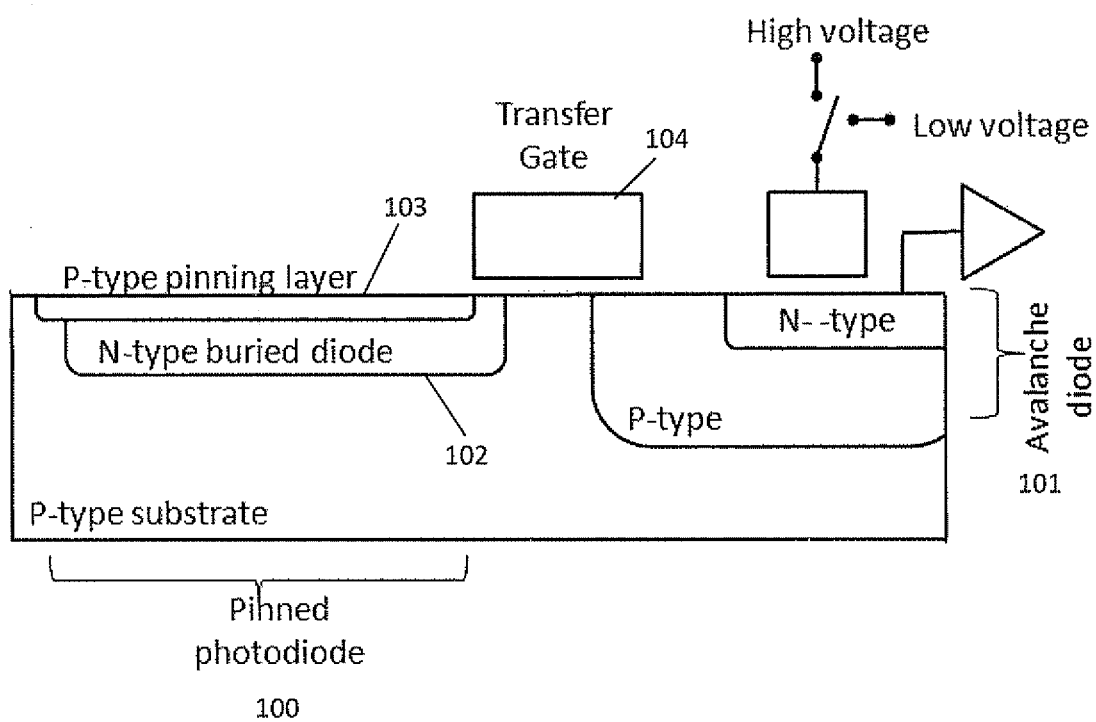
Figure 24:
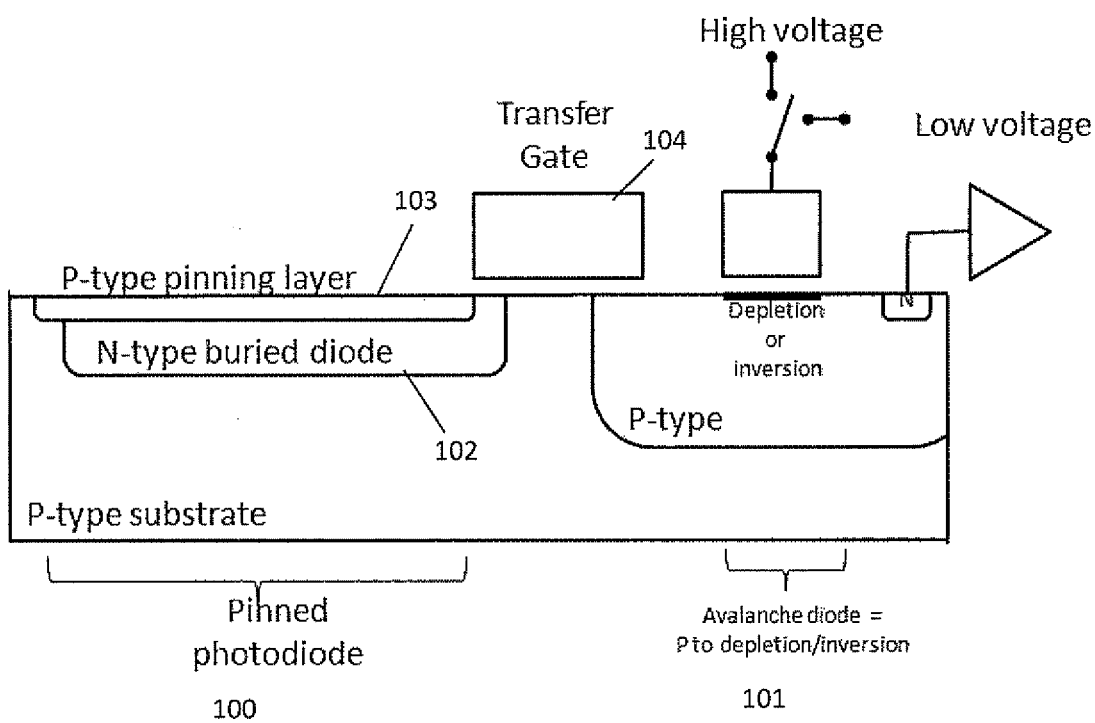

In embodiments of the present invention, the avalanche diode 101 may be a real pn junction, as illustrated in FIG. 22 and FIG. 23. In alternative embodiments, the avalanche diode 101 may be formed by the virtual junction created by a semiconductor layer of a particular dopant polarity (e.g. a P type layer in the embodiment illustrated in FIG. 24, or alternatively an N type layer), and an induced depletion layer or inversion layer of opposite polarity, the depletion layer or inversion layer of opposite polarity for example being induced by a MOS structure.

Using the Pulse Detector's Output

Figure 10:
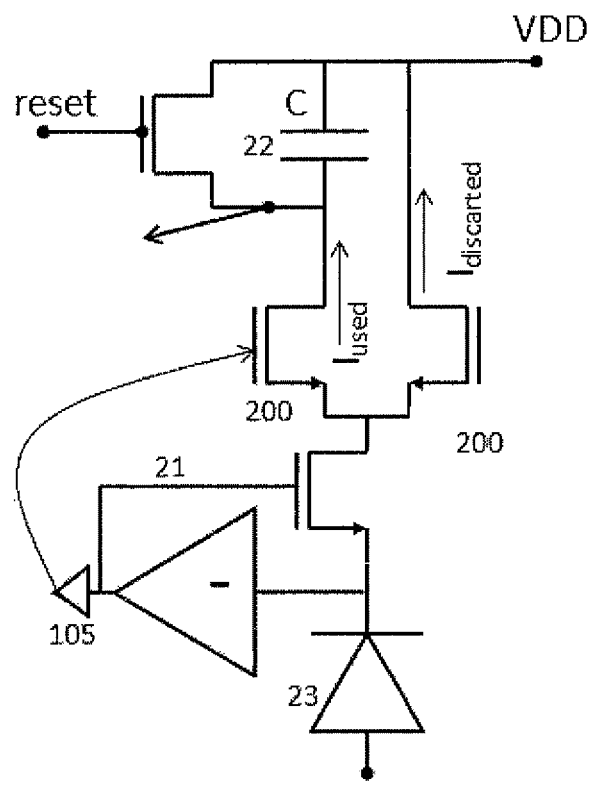
FIG. 10 illustrates an example of a pixel according to embodiments of the present invention where the output of a pulse detector modulates an integrator inside a same pixel.

One embodiment of the use of a pulse detector's output to modulate the sensing signal in an integrator inside the same pixel is shown in FIG. 10. The pixel illustrated has a specific implementation of a radiation detector 23 in series with a pulse detector 21 (similar to the embodiment of FIG. 2), where the current $I_{used}$ that passes through the pulse detector goes to an integrator 22 placed in series. The timing when the current passes through the integrator is determined (modulated) by the configuration of transistors 200 shown, which depends on the relative magnitude of the signals of the pulse detector 21 in the pixel. These pulse detector signals may be processed in an amplifier, comparator or accumulator 105. In a particular embodiment, the processing unit following the pulse shaper 21 may for example be a comparator 105. If a pulse is detected by the pulse detector, the output of the pulse shaper 21 is e.g. compared to a reference value in the comparator 105. If the output of the pulse shaper 21 is larger than the reference value, the output of the comparator is digital 1; if the output of the pulse shaper 21 is smaller than the reference value, the output of the comparator is digital 0. The output of the comparator 105 is fed to a transistor in the series connection between the pulse detector and the integrator, and is used to modulate the fraction of current entering the integrator 22. In the embodiment illustrated in FIG. 10, the sensing signal, e.g. current, is split in fractions between the integrator 22 and being discarded, the fraction being determined by the relative values of the gate voltages of the transistors 200. When the gate voltages are sufficiently different, the transistors 200 act as switches, turning completely on and off the current. The pixel embodiment of FIG. 10 is adapted for performing both pulse detection and integration on the same portion of the sensing signal, in the embodiment illustrated the complete sensing signal, in that, when the switch (left MOSFET 200 in FIG. 10) is closed, the same sensing signal passes in series through the pulse shaper 21 and the integrator 22.

A similar circuit can be envisaged where the pulse detector's signal is used just to suppress the integration when the pulse amplitude exceeds a threshold. This is a useful function to allow integration of sensing signal associated with low amplitude pulse, but not that of large pulses. This may be used to suppress "direct detection" in a situation when only "indirect detection" is wanted.

The detection of a pulse, i.e. the output signal 32 of the pulse detector, can also (on top of or alternatively to being used inside the pixel) be used to modulate, activate or suppress the current in a nearby (close neighbor) pixel, e.g. to enhance sharpness while suppressing integration of photocurrent when the photocurrent is instantaneously higher in a neighboring pixel than in the said pixel itself. Such comparators may be of various natures.

Figure 11:
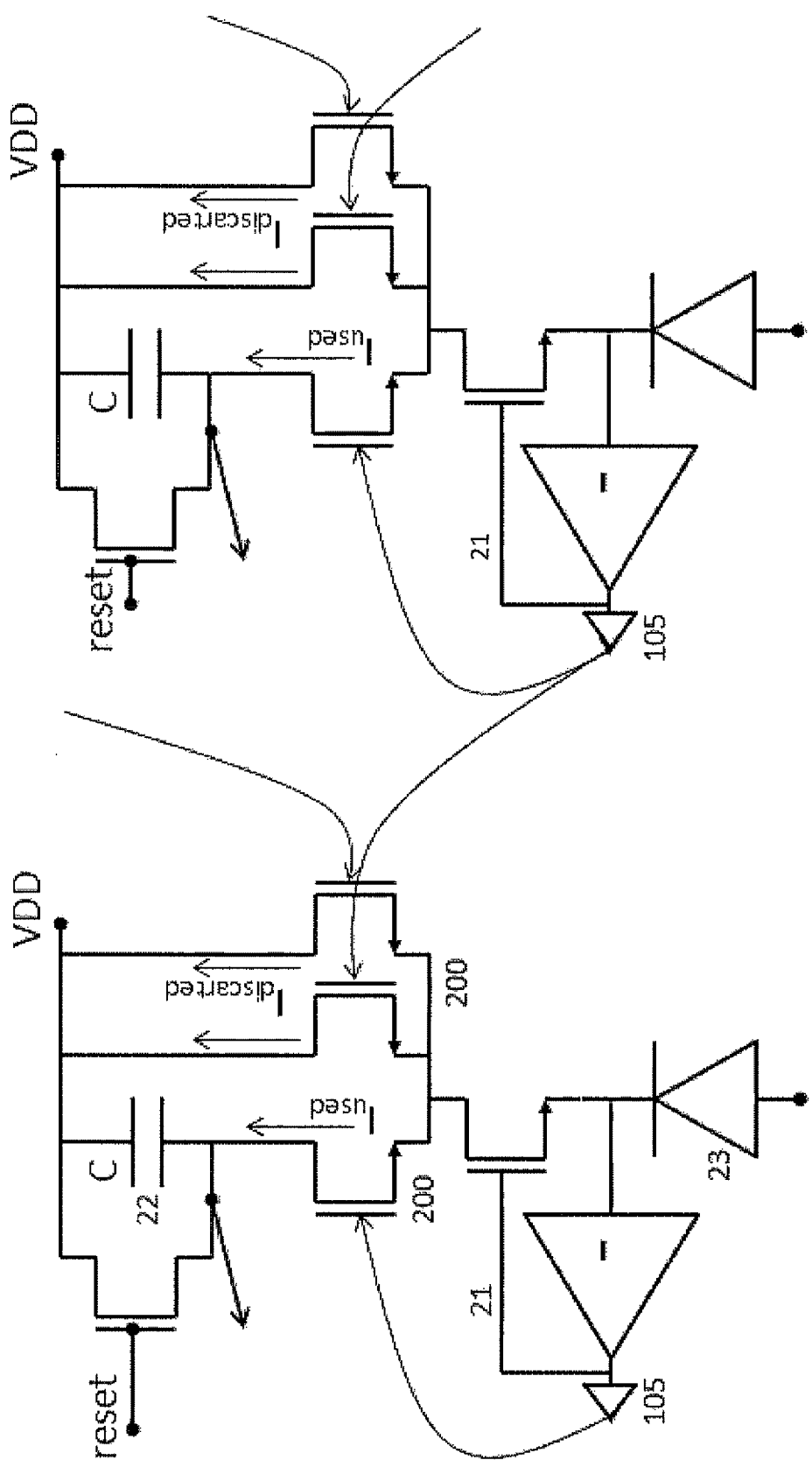
FIG. 11 illustrates an example of an array of pixels according to embodiments of the present invention where the output of a pulse detector modulates an integrator of another pixel.

An embodiment hereof is shown in a series of pixels illustrated in FIG. 11. Shown here are two pixels as part of a larger array, each pixel having a specific implementation of a radiation detector 23 in series with a pulse detector 21 (similar to the pixel illustrated in FIG. 2), where the current $I_{used}$ that passes through the pulse detector goes to an integrator 22 placed in series. For the ease of explanation, hereinafter the pixels illustrated in FIG. 11 are called the "left pixel" and the "right pixel". The timing when the current passes through the integrator of the left pixel is determined (modulated) by the configuration of transistors 200 shown, which depends on the relative magnitude of the signals of the pulse detector 21 in the left pixel itself and of neighboring pixel's pulse detectors, both of the right pixel and optionally other neighboring pixels. These pulse detector signals may be processed, for each pixel, in an amplifier, comparator or accumulator 105. In a particular embodiment, the processing unit following the pulse shaper 21 may for example be a comparator 105, but in other embodiments the part indicated 105 may an amplifier or filter or accumulator too, or may be omitted so as to apply the outputs of the pulse detectors directly. If a pulse is detected by the pulse detector of the right pixel, the output of the pulse shaper 21 is e.g. compared to a reference value in the comparator 105. If the output of the pulse shaper 21 is larger than the reference value, the output of the comparator is digital 1; if the output of the pulse shaper 21 is smaller than the reference value, the output of the comparator is digital 0. The output of the comparator 105 (in particular illustrated in FIG. 11 for the right pixel) is fed to a switch in the series connection between the pulse detector and the integrator in the right pixel, and is used for actuating the switch, as also explained with respect of the embodiment illustrated in FIG. 10. The output of the comparator 105 of the right pixel is furthermore fed to another switch on a path in the left pixel for removing the sensing signal emanating from the radiation transducer and passing through the pulse detector in the left pixel. One path for removing the sensing signal is provided in each pixel for every neighboring pixel which can potentially influence the integration in a particular pixel. In the embodiment illustrated in FIG. 11, each pixel is provided with at least one path which can remove the sensing signal so that it does not get integrated, in the embodiment illustrated two paths. Hence one or more neighboring pixels can influence the integration in a particular pixel, in the embodiment illustrated two neighboring pixels can influence the integration. In the embodiment illustrated in FIG. 11, if the output of the comparator (or amplifier or straight connection) 105 of the right pixel is higher (optionally only slightly higher) than that of the left pixel, then in the right pixel the "used signal" will be larger than the "discarded signal", while in the left pixel the discarded signal" will be larger than the "used signal". If the output of the amplifiers (buffers, comparators, accumulators, processing unit . . . ) 105 are significantly different (such as having logic signal amplitudes) the turning on/off of the currents is complete. Hence, if a neighboring pixel (e.g. the right pixel in the embodiment illustrated) detects a high radiation (higher than compared to the left pixel), integration of the sensing signal in a neighboring pixel (the left pixel in FIG. 11) is suppressed, even if the radiation detected in the left pixel would be non zero also.

Figure 12:
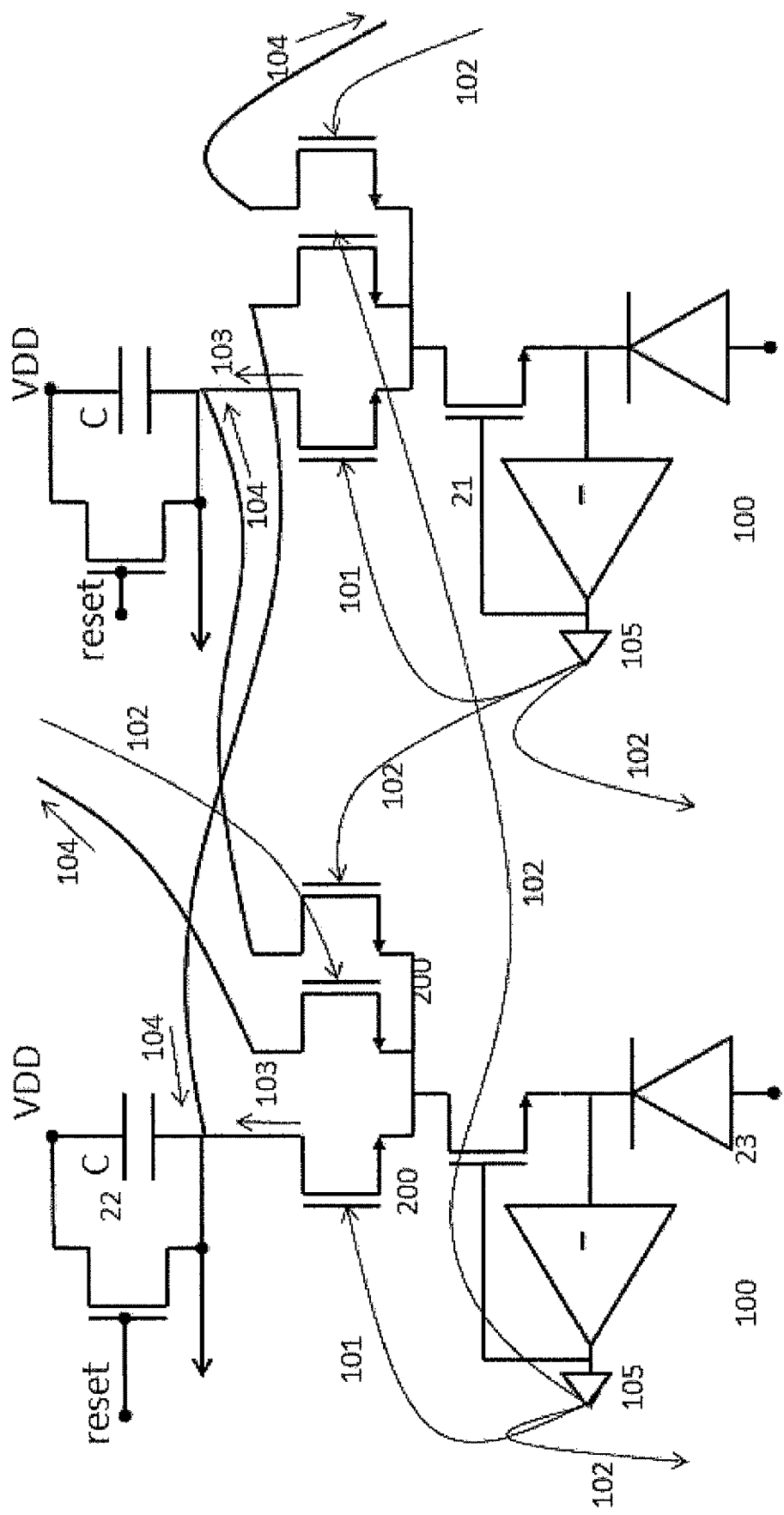
FIG. 12 illustrates an example of an array of pixels according to embodiments of the present invention adapted for being actuated for implementing photon sharpening.

In the embodiment illustrated in FIG. 12, the pixel circuitry compares the pulse amplitude of coinciding pulses of neighboring pixels, and suppresses, or modulates, or redirects, the integration pulse if the pulse of at least one neighboring pixel is larger. For that purpose a circuit is provided that compares the pulse height of the involved pixel and its neighbors. This has as effect that a pulse that is spread out over multiple pixels is only integrated in its maximum pixel position, thus improving the sharpness of the image. In the embodiment illustrated in FIG. 12, two pixels 100 from a large array are shown, each having (at least) one photoreceptor 23, a pulse detector 21 plus processing unit 105, coupled in series with an integrator 22, and a modulating circuit comprising transistors 200. The pixels can integrate radiation sensing signal 103 of the pixel itself, and/or radiation sensing signals 104 from pixels nearby. The modulating circuit uses the output signals 101 of the pulse detectors 21 including processing units 105 in the pixel itself and the outputs 102 of the pulse detectors 21 including processing units 105 of nearby pixels. The functionality implemented in this embodiment is that the modulating circuit redirects sensing signals 104 of nearly pixels to the pixel itself, when the pulse detected in the pixel itself is larger than the pulse detected in the nearby pixels. In this way a "sharper" image is obtained. The integration and the pulse detection within one pixel are performed in series on at least the same portion of the same sensing signal.

Figure 13:
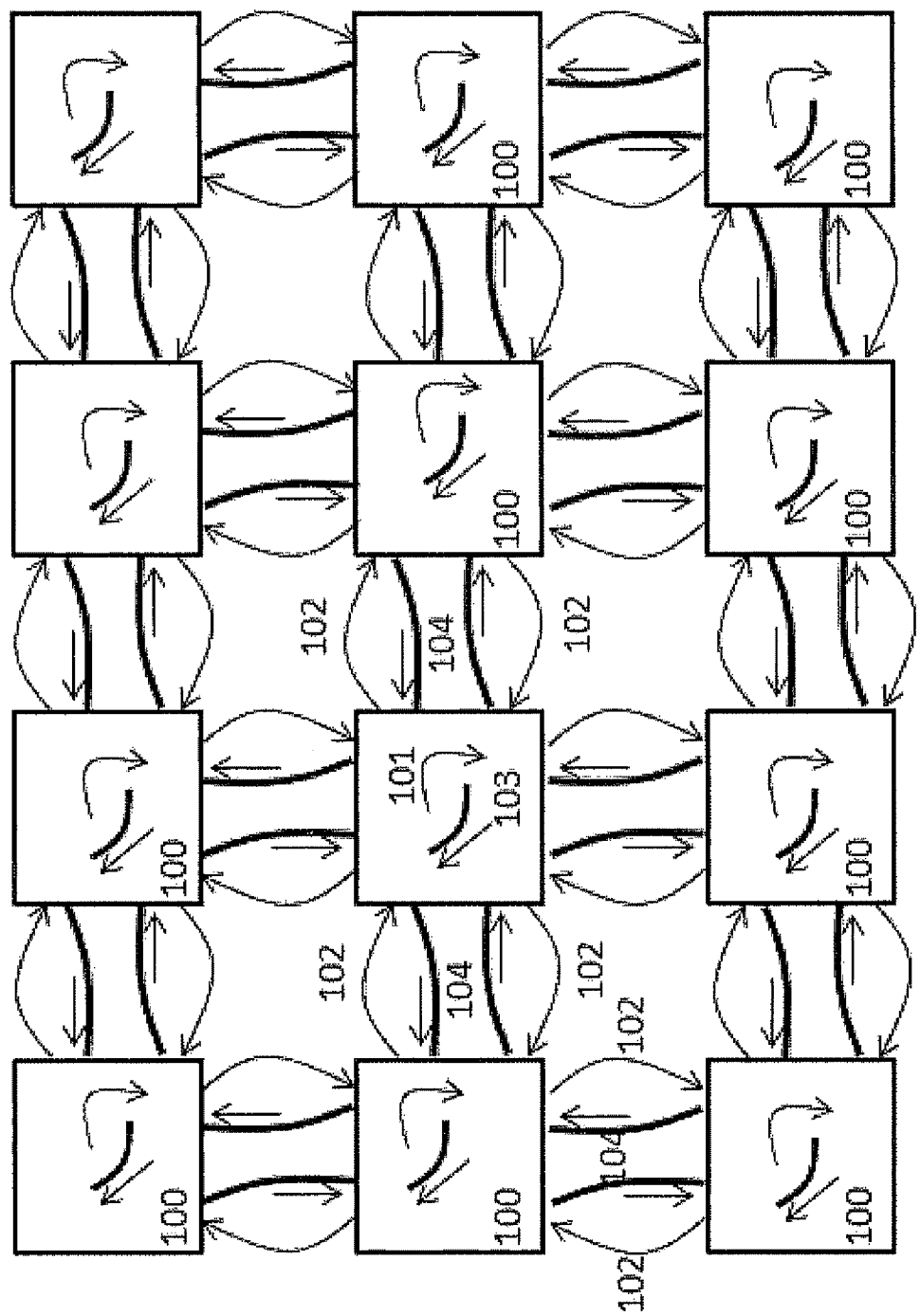
FIG. 13 illustrates a conceptual overview of an array of pixels as in FIG. 12.

FIG. 13 is a schematic illustration of a 4×3 pixel array of such pixels 100 in FIG. 12, whereby an (non-limiting) example is shown how the sensing signals 104 of pixels nearby are connected, and how the corresponding pulse detector outputs 102 are fed to pixels nearby. The intra-pixel signals 101 and 103 are symbolically indicated too.

Figure 14:
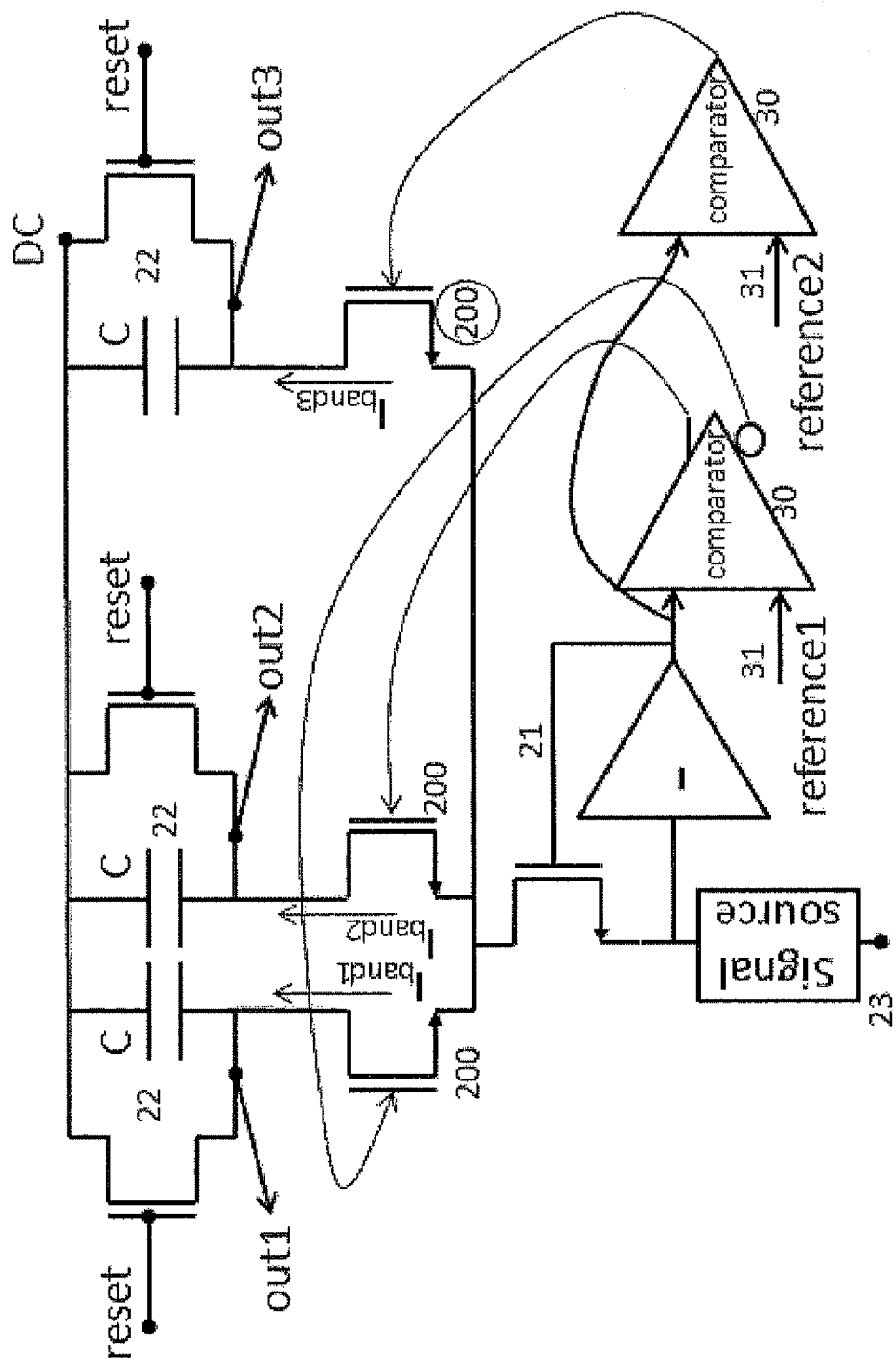
FIG. 14 illustrates another example of a pixel according to embodiments of the present invention where the output of a pulse detector modulates a plurality of integrators inside a same pixel.

Such modulation circuit as illustrated in FIG. 12 may also be used in other embodiments of the present invention to realize spectral sensitivity, by integrating signals only or selectively when a certain range of pulse magnitudes is detected in a pulse detector and its related circuitry, as shown in FIG. 14. A pixel is illustrated with a photoreceptor 23, one pulse detector 21, and a plurality of integrators 22, e.g. three (as an example only, can be any number). The sensing signal, e.g. current, from the photoreceptor 23 is detected by the pulse detector 21 and is integrated in the plurality of integrators 22, but the fraction of the sensing signal that goes to each of the integrators is determined by the three transistors 200, being driven by the outputs of comparators 30 that compare the pulse shaper output to one or several references 31. In that way, each integrator integrates the photocurrent that "belongs" to the pulses that are positively detected by a certain comparator, hence current pulses of different amplitude are accumulated in different comparators. Pulse detection and integration are performed on at least part of the same sensing signal.

Detecting Pulses and Static Defects by Comparing Integrator Outputs

It is a particular embodiment and method of the present invention to realize pulse detection by a comparison of the outputs of two or more integration circuits that operate on two or more radiation receptors inside the same pixel. Assuming that radiation intensities are more or less homogeneous across neighboring radiation receptors, if one of the integrated signals is sufficiently larger than the other(s) this means that it must have received at least one larger pulse. This is relevant in the situation where the radiation creates a mix of largely different pulse magnitudes, such as the case where in an indirect X-ray detection and charge integration setup, sporadically a much larger "direct detection" takes place. The direct detection event is significant to the integrated charge, but is unwanted as it creates "speckle" noise. In such case, the comparison of two or more integration signals tells that a pulse is detected, and an obvious consequence is that the circuit discards the integrated signal that has the larger signal. Both these operations (detecting which integrator output is larger, and discarding the largest, is equivalent to a "minimum" (or "maximum" depending on polarity) operator.

Figure 15:
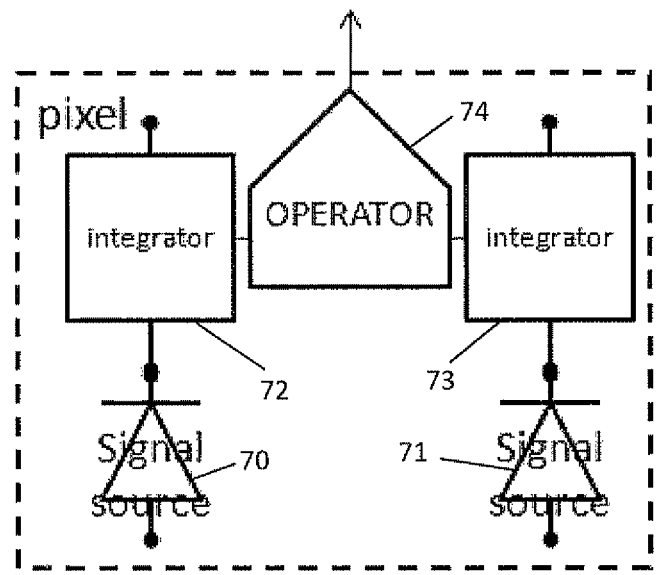
FIG. 15 conceptually illustrates a pixel according to embodiments of the present invention provided with a plurality of photoreceptors and corresponding integrators, in which the output signals of the plurality of integrators are applied to a non-linear operator within the pixel.

One embodiment is schematically illustrated in FIG. 15, which shows a pixel that has a plurality of radiation receptors 70, 71 (two in the embodiment illustrated) and integrator circuitry 72, 73 to integrate the signal of the receptors 70, 71 separately and concurrently. The signals of both integrators 72, 73 are then combined in a non-linear operator 74 such as e.g. a minimum circuit inside the pixel.

Figure 16:
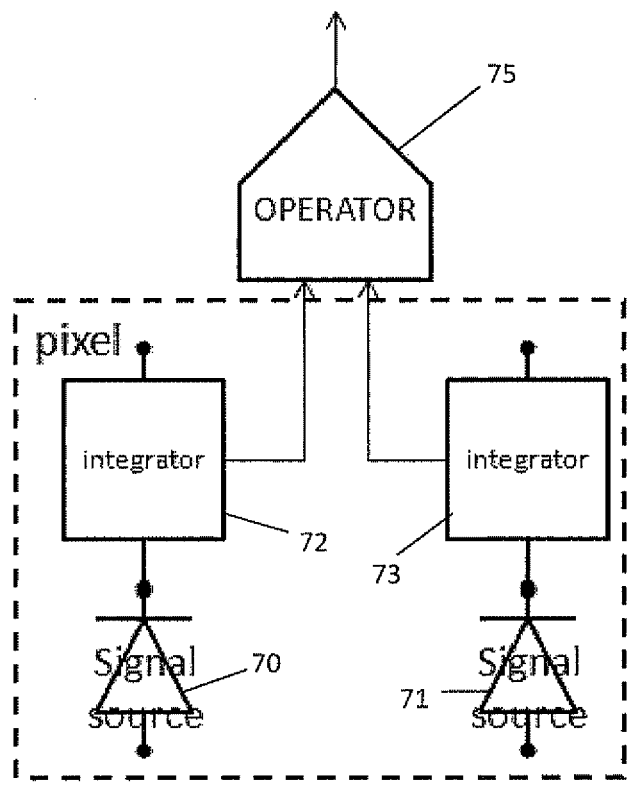
FIG. 16 conceptually illustrates a pixel according to embodiments of the present invention provided with a plurality of photoreceptors and corresponding integrators, in which the output signals of the plurality of integrators are applied to a non-linear operator outside the pixel but common to a plurality of pixels.

An alternative embodiment is schematically illustrated in FIG. 16. A pixel has a plurality of radiation receptors 70, 71 (two in the embodiment illustrated) and the circuitry 72, 73 to integrate the signal of each of the radiation receptors 70, 71 separately and concurrently. The signals of both integrators 72, 73 are then combined in a non-linear operator 75 outside the pixel, in a part of the device that is common to many pixels, for example to a column of pixels in an array of pixels.

Figure 17:
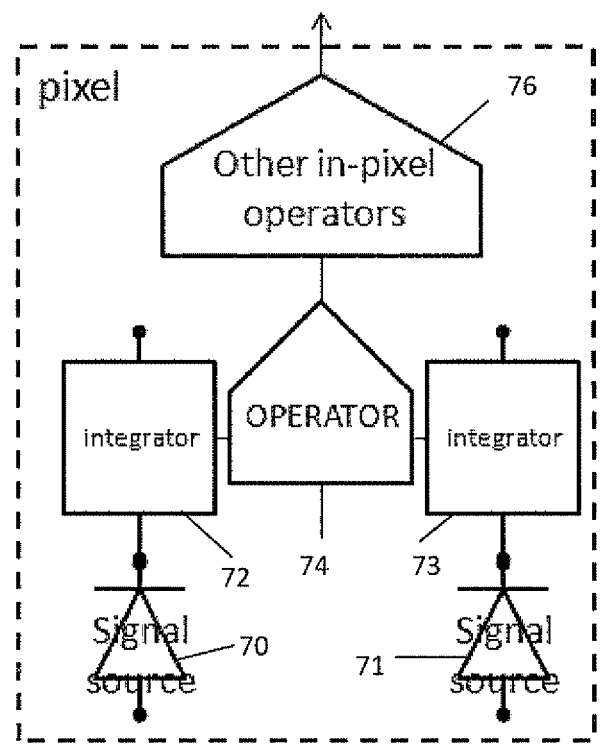
FIG. 17 conceptually illustrates a pixel according to embodiments of the present invention provided with a plurality of photoreceptors and corresponding integrators, in which the output signals of the plurality of integrators are applied to a non-linear operator within the pixel, after which the output of the operator is applied to a further operator.

Yet an alternative embodiment is schematically illustrated in FIG. 17. In this embodiment, the pixel looks like a pixel illustrated in FIG. 15, but furthermore comprises further processing means 76 for processing the result of the non-linear operator 74 inside the pixel.

Two such embodiments are described in more detail here below.

It is to be noted, however, that such pixels are suitable not only to detect and remove transient effects as the suppression of a so-called "single event", but also to remove static defects. Strongly deviating pixels due to DSNU (Dark Signal Non-Uniformity), hot pixels, proton damaged pixels, RTS (Random Telegraph Signal) dark current pixels etc. can be suppressed by segmenting the photoreceptor in a pixel in several sub-parts. The defect is usually present in only one sub-part. Thus, by doing a non linear operation (i.e. something else than averaging or summing) on the sub-parts, one can remove the extremum sub-part signal form the total pixel's signal.

As an example it is assumed that the pixel's photodiode is segmented in 4 parts, and that a bright (transient or fixed) defect is in one part. Then an OPERATOR can be applied such as one of the following:

Take the minimum of all sub-parts the overall pixel signal. This is not the best possibility as one will not use the other subparts to average out the noise.

Eliminate the largest reading of sub-parts and read the average of the remaining sub-parts. This has as disadvantage that also good pixels will suffer some increased noise.

Reduce the largest of all subparts to a level that has a certain maximum value above the other subparts (such as the $2^{nd}$ largest responding subpart, or the average+a certain offset of all pixels etc, or the minimum subpart+a certain offset), and then make the average of all. This does not come with a noise penalty, however, one cannot completely eradicate bright sub-pixels.

One can use an analog domain circuit that takes the average of the signals that are close together, and the minimum (or maximum) when signals are further apart. Such circuit functionality is obtained by tying the outputs of source followers together as in FIG. 7T or 11T. Such circuit functionality can also be placed outside the pixel, as in FIG. 8T and implicitly "FIG SHARED".

The number of sub-parts must at least be 2. Hereinbelow follow a few practical implementations.

Figure 18:
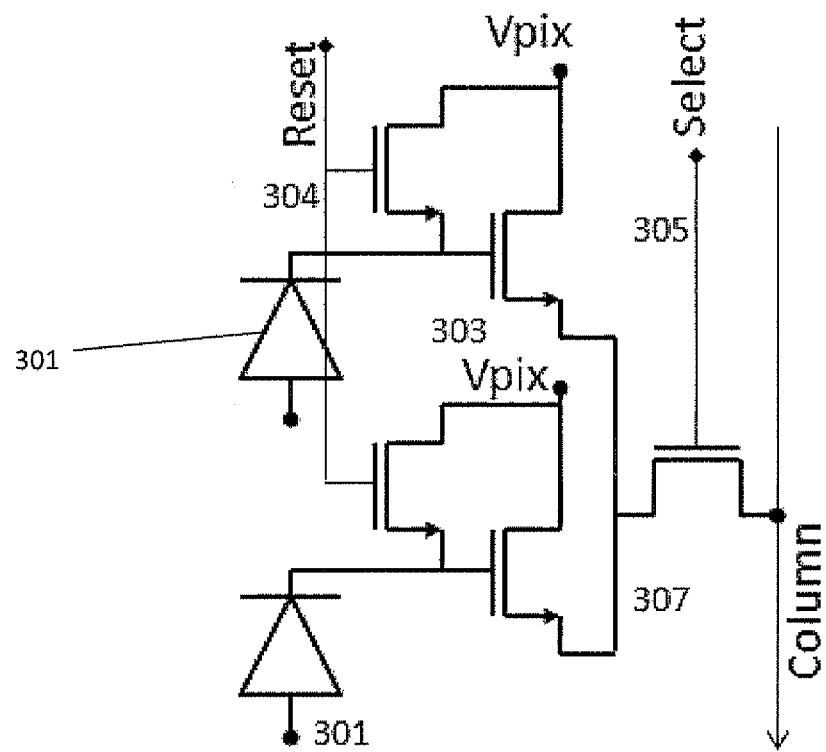
FIG. 18 illustrates an example a pixel of the embodiment of FIG. 15.

FIG. 18 illustrates a practical implementation of the embodiment illustrated in FIG. 15. FIG. 18 illustrates a pixel comprising a plurality of photoreceptors 301, in the embodiment illustrated two photodiodes but the invention not being limited thereto, neither to the type nor to the number of photoreceptors. Signals from the plurality of photoreceptors 301 are integrated, e.g. on a parasitic capacitance of a source follower MOSFET 303. The integrated signals are being read out by a readout circuit that is driven by common reset pulses 304 and select pulses 305. The plurality (e.g. two) of output signals from the integrators are combined in a non-linear operator 307 (effectively this example realizes approximately a voltage maximum) in the pixel.

Hence inside one pixel two or more sub-pixels are created with a common readout column. As the plurality of parallel sub-pixels are driven with the same driving signals, from the outside they behave as one pixel. When receiving identical or nearly identical radiation on each sub-pixel, e.g. half-pixel in the embodiment illustrated, the pixel output is nearly identical as if there was only one complete pixel. However, when one sub-pixel, e.g. half pixel, receives significantly more radiation than the other one(s), the signal of that sub-pixel, e.g. half pixel, is a lower voltage, and the operation of the two source followers 303 is such that in case of inequality, the higher output of the sub-pixels, e.g., two halves, "wins". Effectively temporary white pixels (such as due to a large radiation event, a "SE" (single event), or due to RTS noise) or permanent whiter pixels (due to one of the sub-pixels, e.g. two halves, having a severe dark current) is thus suppressed.

Figure 19:
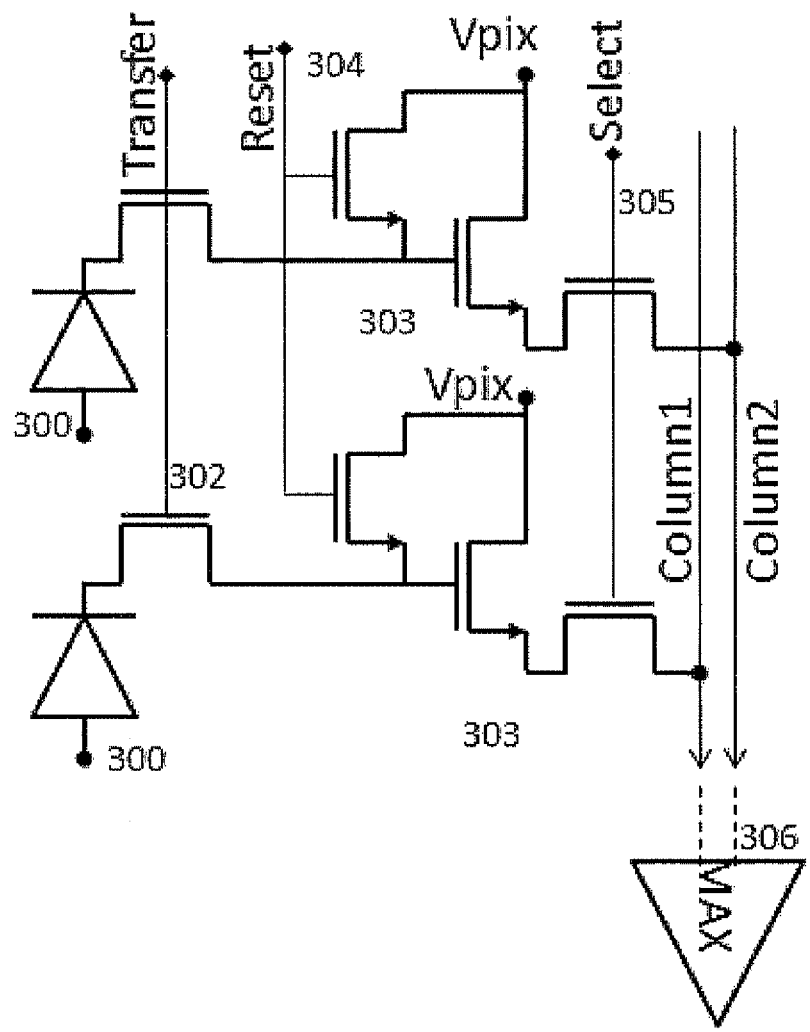
FIG. 19 illustrates an example a pixel of the embodiment of FIG. 16.

FIG. 19 is a practical implementation of the embodiment illustrated in FIG. 16, FIG. 19 illustrates a pixel comprising a plurality of photoreceptors, in the embodiment illustrated two pinned photodiodes 300, but the invention not being limited thereto, neither to the type nor to the number of photoreceptors. The photoreceptors are driven by a common transfer gate pulse 302. Each of the photoreceptors is being read out by a readout circuit 303 that is driven by common reset pulses 304 and select pulses 305. The plurality (e.g. two) of output signals are combined in a non-linear operator 306 (as e.g. a maximum or a minimum operator) outside the pixel.

The pixel in FIG. 19 is very similar to the previous, but here the signal of the two (or more) sub-pixels, e.g. halve pixels, are output over two (or more) parallel column lines, so that the said non-linear operator, e.g. maximum or minimum operator, can take place in the periphery of the array (such as on the position of the column buffer). Such non-linear operator, e.g. maximum operator, can have a better and more sophisticated circuit implementation when it is given more area.

Figure 20:
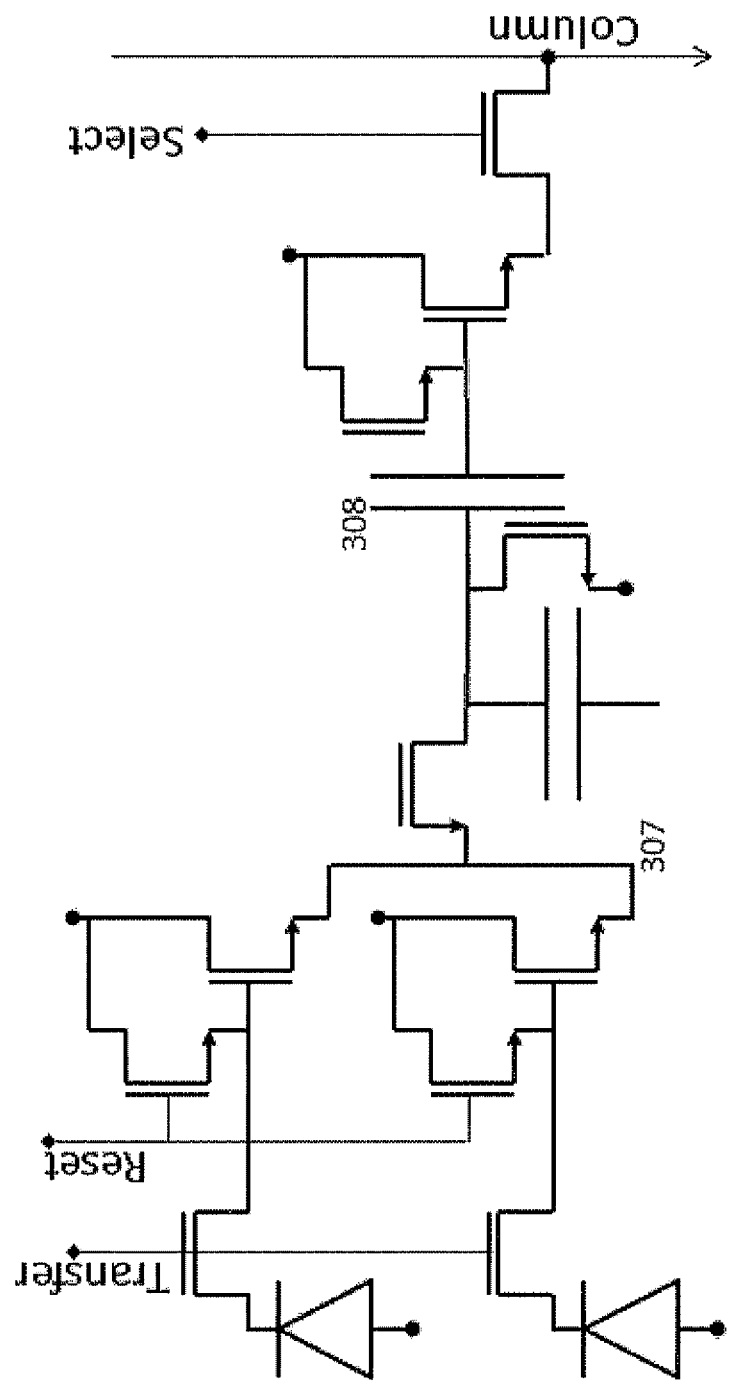
FIG. 20 illustrates an example a pixel of the embodiment of FIG. 17.

Another pixel according to embodiments of the present invention is illustrated in FIG. 20. FIG. 20 illustrates a practical implementation of the embodiment illustrated in FIG. 17. FIG. 20 illustrates a pixel having a plurality of photoreceptors, e.g. two pinned diodes, but the invention not being limited thereto, neither to the type nor to the number of photoreceptors. The photoreceptors are adapted for each integrating charge, resulting in a plurality of, e.g. two, voltages. The plurality of voltages are being non-linearly combined by means of a non-linear operator 307 into one signal, that is then further processed, e.g. in a sample and hold circuit 308 before readout.

The pixel illustrated in FIG. 20 is an example of embodiments of the present invention is applied to a more complex pixel. It is to be noted that only the photoreceptors and the immediate neighboring circuits need to be double. After the non-linear operator, e.g. the maximum operator, the remainder of the pixel circuitry is single for the complete pixel.

Figure 21:
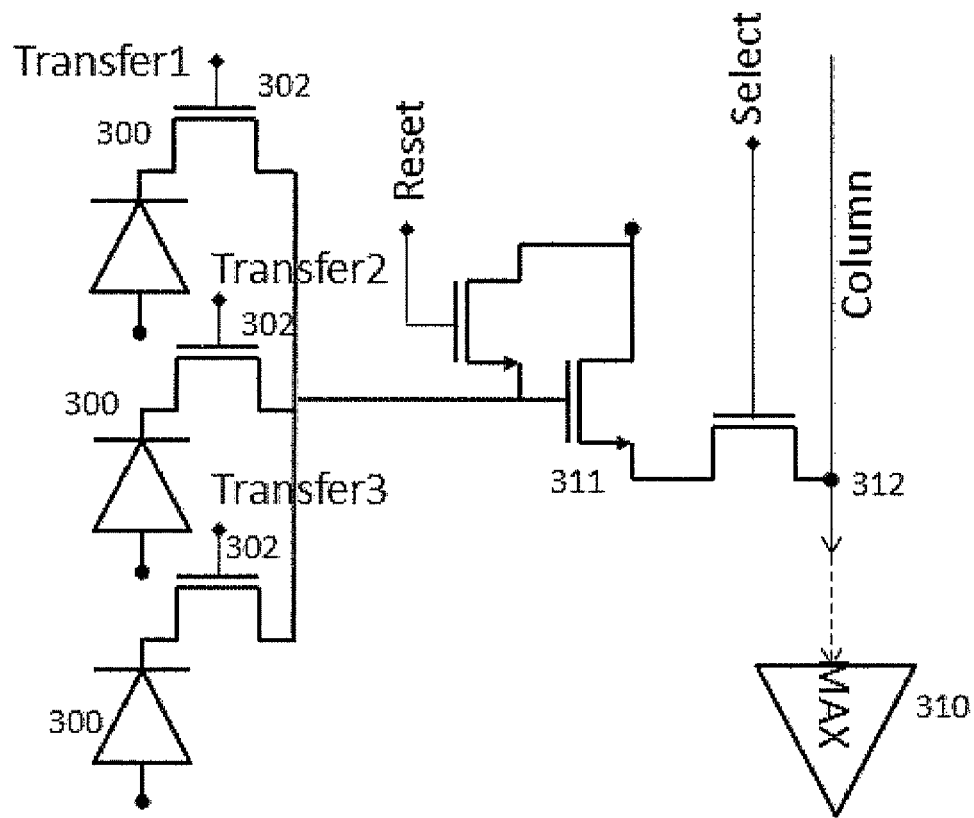
FIG. 21 illustrates an example another pixel of the embodiment of FIG. 16.

The pixel illustrated in the embodiment of FIG. 21 comprises a plurality of photoreceptors, in the embodiment illustrated three photodiodes 300, but the invention is not limited thereto, neither to the type nor to the number of photoreceptors. Each of the photoreceptors are organized for integrating charge. By individually accessing each diode by its transfer gate 302, on can read them out via a buffer 311 to a multiplexer 312. A non-linear operator 310 (such as a maximum operator or a more sophisticated operator) can combine the reading of the photoreceptors into one global pixel reading that suppresses a possible defect sub-part 300. The readings are transferred in a sequent to the multiplexer 312 and hence to the operator 310. The non-linear operator 310 is not shown in detail in this drawing; but may be implemented inside or outside the pixel, in analog or digital domain, it may be enabled or disabled.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

Many alternative embodiments are possible. One such embodiment relates to the photon counting of visible light photons by avalanche photo diodes (APDs) or similar devices. These produce on the detection of a visible light photon a current pulse that can be treated in a similar way as described above, and the amount of detected photons may be accumulated in the analog domain in a similar way.

The invention claimed is:

1. Pixel for image sensing, the pixel comprising:
at least one radiation receptor configured to convert radiation, charge carriers or high energy particles impinging onto the pixel into a sensing signal, wherein the pixel is configured to perform both pulse detection and integration on at least a same portion of the same sensing signal,
at least one pulse detection circuit configured to convert the portion of the sensing signal into a pulse train, and
at least one integration circuit configured to integrate the portion of the sensing signal,
wherein at least one pulse detection circuit and at least one integration circuit are coupled such that, in operation, the same portion of the sensing signal passes in series through the at least one pulse detection circuit and through the at least one integration circuit.

2. Pixel according to claim 1, wherein the pulse detection circuit comprises at least one accumulator configured to count the number of pulses or to discriminate their energy.

3. Pixel according to claim 1, the sensing signal being an electrical signal, the pixel comprising modulation circuitry configured to modulate the electrical signal.

4. Pixel according to claim 1, wherein the at least one pulse detection circuit comprises any of a pulse shaper, a band filter, matched filters, a charge amplifier configured to convert a radiation pulse into an electrical pulse.

5. Pixel according to claim 1, furthermore comprising at least one comparator configured to discriminate pulses in the sensing signal that have a magnitude above or below a reference value, or that lie in a range between two reference values.

6. Pixel according to claim 1, furthermore comprising a memory configured to store output signals of the at least one pulse detection circuit and/or the at least one integration circuit.

7. Pixel according to claim 1, wherein the integrator is a pinned photodiode and the pulse detector is an avalanche diode.

8. An array of pixels as recited in claim 1.

9. An array according to claim 8, the pixels comprising modulation circuitry configured to modulate the sensing signal, where the modulation circuitry of a particular pixel is configured to be controlled by an output signal of a pulse detection circuit of that particular pixel and/or by an output signal of a pulse detection circuit of another pixel in the array.

10. Pixel according to claim 1, wherein the pulse detection circuit comprises a pulse shaper in the form of an inverting feedback amplifier and a non-linear resistor in the feedback loop of the feedback amplifier.

11. Pixel according to claim 10, wherein the pulse detection circuit further comprises a non-linear capacitor in the feedback loop of the feedback amplifier.

12. Pixel according to claim 10, wherein the non-linear resistor is implemented as a MOSFET in weak inversion.

13. Pixel according to claim 12, wherein the MOSFET has its drain and gate or source and gate connected together.

14. Pixel according to claim 12, wherein the MOSFET has its source or drain connected to a node that is not part of the pulse shaper circuit.

15. Method for image sensing, the method comprising;
detecting radiation, charge carriers or high energy particles,
converting the detected radiation, charge carriers or high energy particles into a sensing signal,
wherein the method further comprises performing pulse detection and integration of at least a same portion of the same sensing signal, the pulse detection including converting the portion of the sensing signal into a pulse train, and the integration including integrating the portion of the sensing signal, such that pulse detection and integration are in series applied to the same portion of the sensing signal.

16. Image sensing device comprising at least one pixel, the pixels comprising at least two radiation receptors configured to convert radiation, charge carriers or high energy particles impinging onto the pixel into a sensing signal, the pixels being configured to perform integration of each of the sensing signals, and at least one non-linear operator configured to apply a non-linear operator on the integrated sensing signals of a pixel.

17. Image sensing device according to claim 16, wherein the at least one non-linear operator is an operator provided in each of the pixels.

18. Image sensing device according to claim 16, wherein the at least one non-linear operator is an operator common to a plurality of pixels.

19. Image sensing device according to claim 18, furthermore comprising a multiplexer between the plurality of pixels and the non-linear operator.

* * * * *